(12) United States Patent
Asai et al.

(10) Patent No.: US 10,288,089 B2
(45) Date of Patent: May 14, 2019

(54) ACTUATOR AND METHOD FOR DRIVING THE ACTUATOR

(71) Applicant: Panasonic Intellectual Property Management Co., Ltd., Osaka (JP)

(72) Inventors: Katsuhiko Asai, Nara (JP); Takayuki Nagata, Osaka (JP); Kazuo Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 150 days.

(21) Appl. No.: 15/671,918

(22) Filed: Aug. 8, 2017

(65) Prior Publication Data
US 2018/0058480 A1  Mar. 1, 2018

(30) Foreign Application Priority Data
Aug. 29, 2016 (JP) .................. 2016-167272

(51) Int. Cl.
*F15B 15/10* (2006.01)
*B25J 9/10* (2006.01)
(Continued)

(52) U.S. Cl.
CPC .......... *F15B 15/103* (2013.01); *B25J 9/1075* (2013.01); *B25J 9/142* (2013.01); *F15B 15/06* (2013.01)

(58) Field of Classification Search
CPC ....... F15B 15/06; F15B 15/103; B25J 9/1075; B25J 9/142
See application file for complete search history.

(56) References Cited

U.S. PATENT DOCUMENTS

| 737,154 A | * | 8/1903 | Sayer | .................... F16F 9/0454 |
| | | | | 267/122 |
| 3,561,330 A | * | 2/1971 | Rich | ....................... B25B 5/061 |
| | | | | 294/119.3 |

(Continued)

FOREIGN PATENT DOCUMENTS

JP       59-197605       11/1984

OTHER PUBLICATIONS

Tadashi Yamashita et al., "Control of Stiffness and Torque by Antagonistically Driven Joint: Experimental Study Using Air Actuated Mechanism", Journal of the Robotics Society of Japan, vol. 13 No. 5, pp. 666-673, Jul. 1995 (Whole sentence Translation).

*Primary Examiner* — Thomas E Lazo
(74) *Attorney, Agent, or Firm* — Wenderoth, Lind & Ponack, L.L.P.

(57) ABSTRACT

An actuator includes a displaceable portion, first to fourth artificial muscles, a pressure adjuster that changes a pressure of a fluid filled in the first and second artificial muscles, an open-close valve that allows a fluid to flow into or out of the third and fourth artificial muscles, and a controller that drives the pressure adjuster and controls the open-close valve. Each of the first to fourth artificial muscles includes a coiled elastic tube. In an outer circumferential surface of the tube, grooves are helically formed about an axis of the tube. The tube is filled with a fluid. In the first artificial muscle, a direction in which the tube is coiled is opposite to a direction in which the grooves extend helically. In each of the second to fourth artificial muscles, a direction in which the tube is coiled is the same as a direction in which the grooves extend helically.

12 Claims, 14 Drawing Sheets

(51) Int. Cl.
*B25J 9/14* (2006.01)
*F15B 15/06* (2006.01)

(56) References Cited

U.S. PATENT DOCUMENTS

| | | | | |
|---|---|---|---|---|
| 3,981,528 A | * | 9/1976 | Andorf | B25J 15/0023 |
| | | | | 294/119.3 |
| 4,739,692 A | * | 4/1988 | Wassam | B25J 9/06 |
| | | | | 901/21 |
| 7,555,969 B2 | * | 7/2009 | Okazaki | B25J 9/1075 |
| | | | | 74/490.05 |
| 8,700,215 B2 | * | 4/2014 | Komatsu | B25J 9/1075 |
| | | | | 700/254 |
| 9,771,956 B2 | * | 9/2017 | Asai | F15B 15/103 |

* cited by examiner

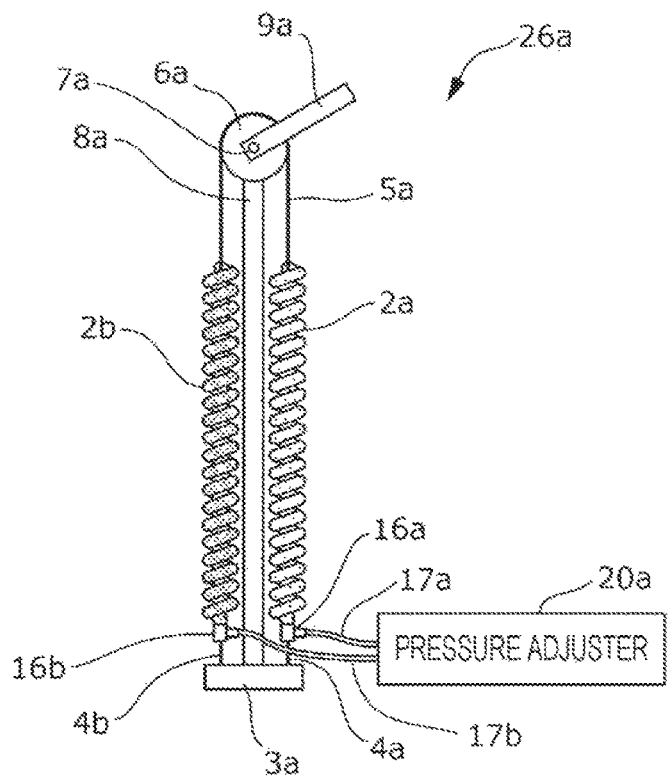
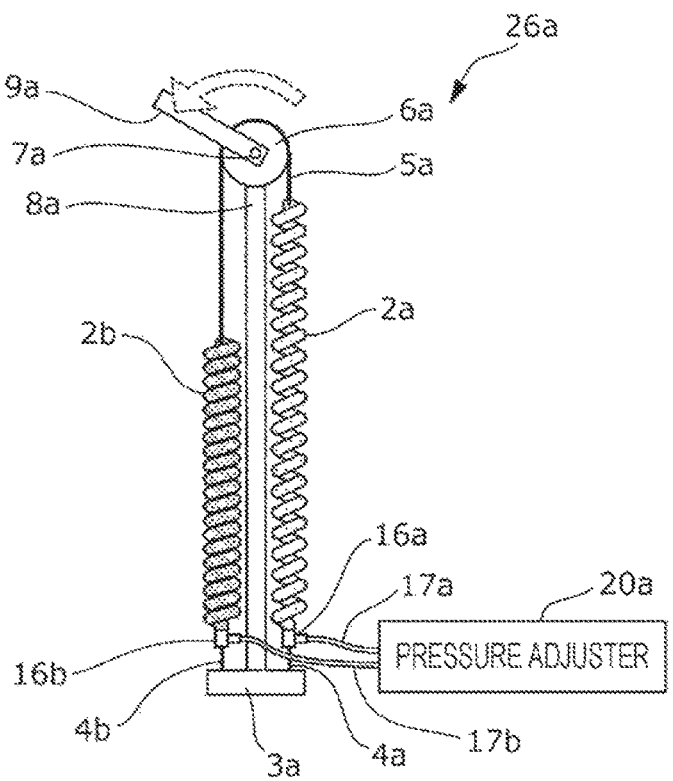

ACTUATOR AND METHOD FOR DRIVING THE ACTUATOR

BACKGROUND

1. Technical Field

The present disclosure relates to an actuator including multiple artificial muscles and a method for driving the actuator.

2. Description of the Related Art

With increasing demand for machines operating in the household environment, such as domestic robots, expectations on artificial muscle actuators having light-weight and flexible properties like human muscles have been increasing. Actuators called artificial muscle actuators have various types. Most of them are actuators that utilize deformation of rubber-like elastic materials having light-weight and flexible properties.

As an example of actuators that utilize deformation of rubber-like elastic materials, a McKibben actuator that contracts and expands using fluid pressure is known (for example, see Japanese Unexamined Patent Application Publication No. 59-197605).

The McKibben actuator described in Japanese Unexamined Patent Application Publication No. 59-197605 is formed from a rubber tube reinforced with braided structure. The actuator is caused to contract and expand by converting radial expansion of the rubber tube into axial contraction while the inside of the rubber tube is pressurized by a fluid to change the braided angle in a manner like a pantograph.

When a displaceable portion, such as a rotatable disk or an arm, is to be included in such an actuator and the displaceable portion is to be moved, an antagonistic actuator is used as an example of the actuator for performing a stable bidirectional operation (see, for example, "Control of Stiffness and Torque by Antagonistically Driven Joint: Experimental Study Using Air Actuated Mechanism" written by Tadashi Mamashita and three others in Journal of The Robotics Society of Japan, Vol. 13, No. 5, pp. 666 to 673, 1995).

The McKibben actuator described in Japanese Unexamined Patent Application Publication No. 59-197605 has nonlinear properties with which the stiffness increases with increasing pressure. In an antagonistic actuator including two McKibben actuators, when the pressure on the actuators is changed to change the position (for example, angle) of a displaceable portion, the stiffness of the displaceable portion in a movement direction (actuator stiffness) is also unintentionally changed.

SUMMARY

One non-limiting and exemplary embodiment provides an actuator capable of independently adjusting the position of a displaceable portion and the stiffness or capable of adjusting the position of a displaceable portion without changing the stiffness.

In one general aspect, the techniques disclosed here feature an actuator including a displaceable portion including a first member and a second member, a first artificial muscle, and a second artificial muscle. A force generated by the first artificial muscle and the second artificial muscle is transmitted to the second member using the first member and the transmitted force displaces the second member in a first direction or a second direction opposite to the first direction. The first artificial muscle includes a coiled elastic first tube. The first tube has either one or both of a helical first groove in an outer circumferential surface of the first tube and a helical second groove in an inner circumferential surface of the first tube. A center axis of a helix of the first groove and a center axis of a helix of the second groove serve as an axis of the first tube. The first tube is filled with a first fluid. The second artificial muscle includes a coiled elastic second tube. The second tube has either one or both of a helical third groove in an outer circumferential surface of the second tube and a helical fourth groove in an inner circumferential surface of the second tube. A center axis of a helix of the third groove and a center axis of a helix of the fourth groove serve as an axis of the second tube. The second tube is filled with a second fluid. A direction in which the first tube is coiled is opposite to a direction in which the first groove extends helically and a direction in which the second groove extends helically. A direction in which the second tube is coiled is the same as a direction in which the third groove extends helically and a direction in which the fourth groove extends helically.

It should be noted that general or specific embodiments may be implemented as a device, a system, a method, or any selective combination thereof.

An actuator disclosed herein is capable of independently adjusting the position of a displaceable portion and the stiffness or capable of adjusting the position of a displaceable portion without changing the stiffness. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10A is a schematic diagram of a position changer according to the first embodiment in an initial state;

FIG. 10B is a schematic diagram of the position changer according to the first embodiment in the state where the fluid inside the artificial muscles is pressurized;

DETAILED DESCRIPTION

Figure 1:
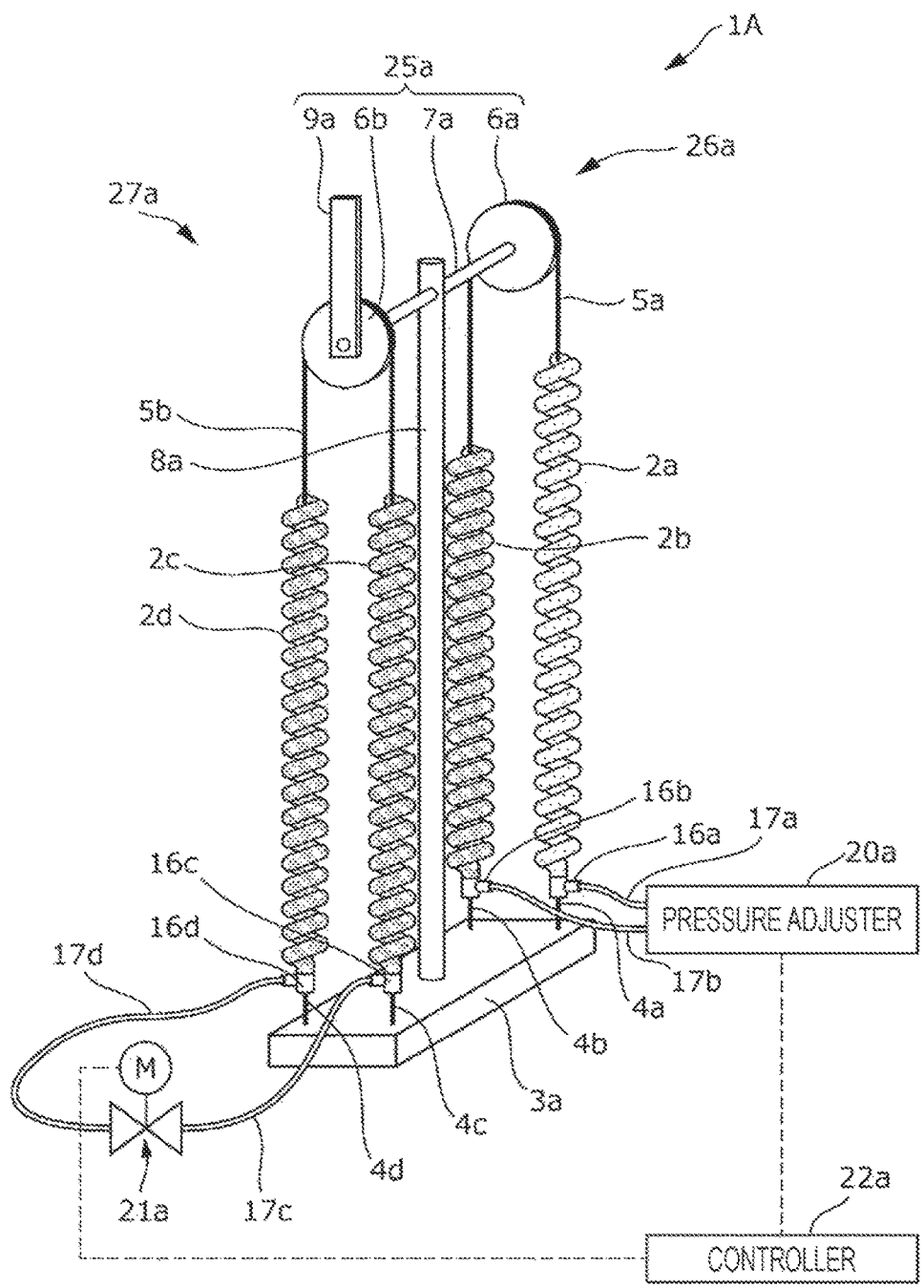
FIG. 1 is a schematic diagram of an actuator according to a first embodiment.

Underlying Knowledge Forming Basis of the Present Disclosure

The inventors have found that an antagonistic actuator including McKibben actuators and described in "Description of the Related Art" has the following problems.

A McKibben actuator has nonlinear properties with which the stiffness increases with increasing pressure. When an antagonistic actuator includes two McKibben actuators, not only the joint angle (position) is changed by a pressure difference between the two McKibben actuators, but also the joint stiffness is changed with a concurrent change of the pressures of the two McKibben actuators.

Such properties are useful for, for example, a robot joint that changes the joint stiffness in accordance with the situation. When, on the other hand, the joint stiffness is intended to be changed without changing the joint angle, the pressures on two McKibben actuators need to be increased while keeping balance between them such that the joint angle does not change. Such a control is complex. When, on the other hand, the joint angle is intended to be changed without changing the joint stiffness, the pressures on two McKibben actuators need to be changed while keeping balance between them such that the joint stiffness does not change. Such a control is complex.

For example, when an actuator is used as a wearable walk assist device, the actuator is supposed to have a low stiffness when legs are caused to swing back and forth and the actuator is supposed to have a high stiffness when the legs stand firm on the ground. The actuator disclosed herein is capable of independently adjusting the position of the displaceable portion and the actuator stiffness, so that the actuator is usable as the above wearable device.

An actuator disclosed herein includes a displaceable portion including a first member and a second member, a first artificial muscle, and a second artificial muscle. A force generated by the first artificial muscle and the second artificial muscle is transmitted to the second member using the first member and the transmitted force displaces the second member in a first direction or a second direction opposite to the first direction. The first artificial muscle includes a coiled elastic first tube. The first tube has either one or both of a helical first groove in an outer circumferential surface of the first tube and a helical second groove in an inner circumferential surface of the first tube. A center axis of a helix of the first groove and a center axis of a helix of the second groove serve as an axis of the first tube. The first tube is filled with a first fluid. The second artificial muscle includes a coiled elastic second tube. The second tube has either one or both of a helical third groove in an outer circumferential surface of the second tube and a helical fourth groove in an inner circumferential surface of the second tube. A center axis of a helix of the third groove and a center axis of a helix of the fourth groove serve as an axis of the second tube. The second tube is filled with a second fluid. A direction in which the first tube is coiled is opposite to a direction in which the first groove extends helically and a direction in which the second groove extends helically. A direction in which the second tube is coiled is the same as a direction in which the third groove extends helically and a direction in which the fourth groove extends helically.

In this structure, for example, the first artificial muscle expands and the second artificial muscle contracts as a result of the fluid inside the first tube and the second tube being pressurized. Thus, the actuator can displace the displaceable portion with a predetermined pressure while the actuator is kept in an antagonistic state. At this time, the sum of the tension of the first artificial muscle and the tension of the second artificial muscle remains the same. Thus, the position of the displaceable portion can be adjusted without changing the actuator stiffness.

For example, the first artificial muscle may be formed from the same material as the second artificial muscle and may have the same coil diameter and the same coil pitch in relaxed length as the second artificial muscle, and, when the first tube and the second tube are uncoiled, the first tube may have the same shape as the second tube or may have a shape of a plane symmetric reflection of the shape of the second tube.

In this structure, for example, an amount of displacement of the first artificial muscle (length by which it expands) and an amount of displacement of the second artificial muscle (length by which it contracts) are equivalent to each other. Thus, the displaceable portion can be displaced with a predetermined pressure while the actuator is kept in an antagonistic state.

The actuator may further include a pressure adjuster, which changes a pressure of the first fluid and a pressure of the second fluid, and a controller. To displace the second member in the first direction, the controller may instruct the pressure adjuster to increase the pressure of the first fluid and the pressure of the second fluid and thus expand the first artificial muscle and contract the second artificial muscle. To displace the second member in the second direction, the controller may instruct the pressure adjuster to reduce the pressure of the first fluid and the pressure of the second fluid and thus contract the first artificial muscle and expand the second artificial muscle.

In this structure, for example, the first artificial muscle expands and the second artificial muscle contracts as a result of the fluid inside the first tube and the second tube being pressurized by the pressure adjuster. Thus, the actuator can displace the displaceable portion with a predetermined pressure exerted from the pressure adjuster while being kept in an antagonistic state.

The actuator may further include a third artificial muscle and a fourth artificial muscle, on which a force is exerted from the first artificial muscle and the second artificial muscle with the first member interposed therebetween, and an open-close valve, disposed in a pipe connecting the third artificial muscle and the fourth artificial muscle to each other. The third artificial muscle may include a coiled elastic third tube. The third tube may have either one or both of a helical fifth groove in an outer circumferential surface of the third tube and a helical sixth groove in an inner circumferential surface of the third tube. A center axis of a helix of the fifth groove and a center axis of a helix of the sixth groove may serve as an axis of the third tube. The fourth artificial muscle may include a coiled elastic fourth tube. The fourth tube may have either one or both of a helical seventh groove in an outer circumferential surface of the fourth tube and a helical eighth groove in an inner circumferential surface of the fourth tube. A center axis of a helix of the seventh groove and a center axis of a helix of the eighth groove may serve as an axis of the fourth tube. A direction in which the third tube is coiled may be the same as or opposite to a direction in which the fifth groove extends helically and a direction in which the sixth groove extends helically. A direction in which the fourth tube is coiled may be the same as the direction in which the third tube is coiled and a direction in which the seventh groove extends helically and a direction in which the eighth groove extends helically may be the same as the direction in which the fifth groove extends helically, or, the direction in which the fourth tube is coiled may be opposite to the direction in which the third tube is coiled and the direction in which the seventh groove extends helically and the direction in which the eighth groove extends helically may be opposite to the direction in which the fifth groove extends helically. The third tube may be filled with a third fluid and the fourth tube may be filled with a fourth fluid. The pipe may serve as a flow path for the third fluid to flow to the fourth tube and a flow path for the fourth fluid to flow to the third tube. The controller may cause the open-close valve to control opening and closing of the open-close valve so as to control an amount of the third fluid that moves from the third artificial muscle to the fourth artificial muscle and an amount of the fourth fluid that moves from the fourth artificial muscle to the third artificial muscle.

In this structure, either one of the third artificial muscle and the fourth artificial muscle contracts and the other artificial muscle expands in accordance with a position change of the displaceable portion. When the open-close valve is open, the entire capacity of the third artificial muscle and the fourth artificial muscle does not change in accordance with the position change of the displaceable portion since the decrease of the capacity of one artificial muscle is compensated by an increase of the capacity of the other, so that the internal pressure remains unchanged. On the other hand, when the open-close valve is closed, the internal pressure of the artificial muscle whose capacity decreases rises and the internal pressure of the artificial muscle whose capacity increases lowers. Thus, the stiffness can be increased regardless of the position change of the displaceable portion. Thus, a displacement adjustment of the pressure adjuster can be performed independently of a stiffness adjustment of the open-close valve.

For example, the third artificial muscle and the fourth artificial muscle may be formed from the same material and have the same shape.

This structure enables easy adjustment of the stiffness using the open-close valve.

For example, the direction in which the third tube is coiled may be the same as the direction in which the third groove extends helically.

This structure can reduce the load exerted on the third artificial muscle and the fourth artificial muscle compared to the case where the direction in which the third tube is coiled is opposite to the direction in which the third groove extends helically.

For example, the displaceable portion may have a rotation axis about which the first member and the second member are rotatable. A displacement in the first direction may be a rotation in the first direction about the rotation axis. A displacement in the second direction may be a rotation in a direction opposite to the first direction about the rotation axis. The open-close valve may control resistance to a rotation operation of the displaceable portion.

In this structure, the rotation position of the displaceable portion, which rotates, and the stiffness in the rotation direction can be independently adjusted. The "stiffness in the rotation direction" is also referred to as "resistance to the rotation operation".

For example, the first artificial muscle and the third artificial muscle may be arranged side by side so as to extend parallel to each other and the second artificial muscle and the fourth artificial muscle may be arranged side by side so as to extend parallel to each other.

In this structure, for example, by closing the open-close valve while the pressure adjuster is adjusting the position of the displaceable portion, the stiffness can be increased further than the stiffness intrinsic to the first artificial muscle, the second artificial muscle, the third artificial muscle, and the fourth artificial muscle.

For example, the first artificial muscle and the third artificial muscle may be arranged in a line and the second artificial muscle and the fourth artificial muscle may be arranged in a line.

In this structure, for example, by closing the open-close valve while the pressure adjuster is adjusting the position of the displaceable portion, the stiffness of a combination of the first artificial muscle, the second artificial muscle, the third artificial muscle, and the fourth artificial muscle can be approximated to the stiffness of a combination of the first artificial muscle and the second artificial muscle.

For example, a minimum length of the first artificial muscle within a movable range of the displaceable portion may be a relaxed length of the first artificial muscle.

In this structure, for example, the first artificial muscle is used in a expanded state, including the relaxed length, within a displaceable range of the displaceable portion. Thus, an unnecessarily high tension is prevented from being exerted on the first artificial muscle or the second artificial muscle.

For example, the actuator may further include a first pressure-measuring portion that measures a first pressure of the third fluid and a second pressure-measuring portion that measures a second pressure of the fourth fluid. The controller may open the open-close valve when the first pressure or the second pressure deviates from a predetermined pressure range.

In this structure, the third artificial muscle and the fourth artificial muscle are prevented from being brought under a negative pressure or an excessively high pressure.

A method for driving an actuator is disclosed herein. The actuator includes a displaceable portion including a first member, a second member, and a third member, a first artificial muscle, a second artificial muscle, and a third artificial muscle and a fourth artificial muscle, on which a force of the first artificial muscle and the second artificial muscle is exerted using the first member and the third member. The first member is disposed on a path connecting the first artificial muscle and the second artificial muscle to each other and the third member is disposed on a path connecting the third artificial muscle and the fourth artificial muscle to each other. The first artificial muscle includes a coiled elastic first tube. The first tube has either one or both of a helical first groove in an outer circumferential surface of the first tube and a helical second groove in an inner circumferential surface of the first tube. A center axis of a helix of the first groove and a center axis of a helix of the second groove serve as an axis of the first tube. The first tube is filled with a first fluid. The second artificial muscle includes a coiled elastic second tube. The second tube has either one or both of a helical third groove in an outer circumferential surface of the second tube and a helical fourth groove in an inner circumferential surface of the second tube. A center axis of a helix of the third groove and a center axis of a helix of the fourth groove serve as an axis of the second tube. The second tube is filled with a second fluid. The third artificial muscle includes a coiled elastic third tube. The third tube has either one or both of a helical fifth groove in an outer circumferential surface of the third tube and a helical sixth groove in an inner circumferential surface of the third tube. A center axis of a helix of the fifth groove and a center axis of a helix of the sixth groove serve as an axis of the third tube. The third tube is filled with a third fluid. The fourth artificial muscle includes a coiled elastic fourth tube. The fourth tube includes has one or both of a helical seventh groove in an outer circumferential surface of the fourth tube and a helical eighth groove in an inner circumferential surface of the fourth tube. A center axis of a helix of the seventh groove and a center axis of a helix of the eighth groove serve as an axis of the fourth tube. The fourth tube is filled with a fourth fluid. A direction in which the first tube is coiled is opposite to a direction in which the first groove extends helically and a direction in which the second groove extends helically. A direction in which the second tube is coiled is the same as a direction in which the third groove extends helically and a direction in which the fourth groove extends helically. A direction in which the third tube is coiled is the same as or opposite to a direction in which the fifth groove extends helically and a direction in which the sixth groove extends helically. A direction in which the fourth tube is coiled is the same as the direction in which the third tube is coiled and a direction in which the seventh groove extends helically and a direction in which the eighth groove extends helically are the same as the direction in which the fifth groove extends helically, or, the direction in which the fourth tube is coiled is opposite to the direction in which the third tube is coiled and the direction in which the seventh groove extends helically and the direction in which the eighth groove extends helically are opposite to the direction in which the fifth groove extends helically. The actuator further includes a pressure adjuster that changes a pressure of the first fluid and a pressure of the second fluid, an open-close valve disposed in a pipe connecting the third artificial muscle and the fourth artificial muscle to each other, the pipe serving as a flow path for the third fluid to flow to the fourth tube and a flow path for the fourth fluid to flow to the third tube, and a controller that drives the pressure adjuster and controls opening and closing of the open-close valve. The method includes changing the pressure of the first fluid and the pressure of the second fluid using the pressure adjuster in response to a position command issued to change a position of the second member to a target position, calculating a target pressure difference between the third fluid and the fourth fluid on the basis of the position command and a stiffness command issued to change a stiffness of the displaceable portion to a target stiffness, and comparing an actual pressure difference between the third fluid and the fourth fluid with the target pressure difference and approximating the actual pressure difference to the target pressure difference by controlling opening and closing of the open-close valve.

This structure can reliably independently adjust displacement of the actuator and the stiffness.

Hereinbelow, embodiments of an actuator are described with reference to the drawings.

Embodiments described below are general or specific examples. Throughout the embodiments described below, parameters such as numerical values, shapes, materials, components, positions of the components, connection forms of the components, steps, and the order of steps are provided as mere examples and not intended to limit the present disclosure. Among components of the embodiments described below, components not included in the independent claims representing the most superordinate concept are described as optional components.

First Embodiment 1.1 Actuator Structure

An actuator includes a displaceable portion and a pair of actuators, arranged antagonistically to the displaceable portion. The actuator moves the displaceable portion while mutually operating the force of the pair of actuators.

FIG. 1 is a schematic diagram of an actuator 1A according to a first embodiment.

A rough structure of the actuator 1A is described first.

The actuator 1A includes a first artificial muscle 2a and a third artificial muscle 2c, which extend parallel to each other and are arranged side by side, and a second artificial muscle 2b and a fourth artificial muscle 2d, which extend parallel to each other and are arranged side by side. The first artificial muscle 2a and the second artificial muscle 2b also extend parallel to each other and the third artificial muscle 2c and the fourth artificial muscle 2d also extend parallel to each other. Hereinbelow, the first artificial muscle 2a, the second artificial muscle 2b, the third artificial muscle 2c, and the fourth artificial muscle 2d are also referred to as the artificial muscles 2a, 2b, 2c, and 2d.

The artificial muscles 2a to 2d are tubular and filled with a fluid. The artificial muscles 2a to 2d contract or expand in response to a change of the pressure of the fluid inside them. The artificial muscle 2a has a heterochiral structure. The artificial muscles 2b, 2c, and 2d have a homochiral structure. The heterochiral structure and the homochiral structure are described later.

The actuator 1A includes a position changer 26a, which changes the position of the displaceable portion 25a, and a stiffness changer 27a, which changes the stiffness of a displaceable portion 25a in a movement direction.

The displaceable portion 25a includes disks 6a and 6b, a shaft 7a, and an arm 9a, which rotate integrally. The displaceable portion 25a is disposed on a path connecting the artificial muscles 2a and 2b to each other and on a path connecting the artificial muscles 2c and 2d to each other. The displaceable portion 25a is rendered displaceable in a predetermined direction (rotation direction) when the artificial muscles 2a and 2b exert a force in a tangential direction of the disk 6a. The position changer 26a includes the artificial muscles 2a and 2b, coupling wires 4a and 4b, a winding wire 5a, joints 16a and 16b, pipes 17a and 17b, and a pressure adjuster 20a. The stiffness changer 27a includes the artificial muscles 2c and 2d, coupling wires 4c and 4d, a winding wire 5b, joints 16c and 16d, pipes 17c and 17d, and an open-close valve 21a.

The actuator 1A also includes a controller 22a that drives the pressure adjuster 20a and controls opening or closing of the open-close valve 21a.

Now, the structure of the actuator 1A is described.

A first end of the artificial muscle 2a is connected to a base plate 3a with the joint 16a and the coupling wire 4a interposed therebetween. A first end of the artificial muscle 2b is connected to the base plate 3a with the joint 16b and the coupling wire 4b interposed therebetween. Second ends of the artificial muscles 2a and 2b are respectively connected to both ends of the winding wire 5a. The winding wire 5a is wound around the periphery of the disk (sprocket) 6a. The shaft (rotation shaft) 7a is fixed to a center portion of the disk 6a. The disk 6a is rotatable about the axis of the shaft 7a together with the shaft 7a. The shaft 7a is rotatably supported by a post 8a, which is fixed onto the base plate 3a. The artificial muscles 2a and 2b are arranged between the base plate 3a and the disk 6a while being pulled to cause an initial tension. The disk 6a rotates in accordance with the movement of the winding wire 5a resulting from the contraction and expansion of the artificial muscles 2a and 2b.

A first end of the artificial muscle 2c is connected to the base plate 3a with the joint 16c and the coupling wire 4c interposed therebetween. A first end of the artificial muscle 2d is connected to the base plate 3a with the joint 16d and the coupling wire 4d interposed therebetween. Second ends of the artificial muscles 2c and 2d are respectively connected to both ends of the winding wire 5b. The winding wire 5b is wound around the periphery of the disk 6b. The disks 6a and 6b have the same diameter and the same thickness. The shaft 7a is fixed onto a center portion of the disk 6b. The disk 6b is rotatable about the axis of the shaft 7a together with the disk 6a and the shaft 7a. The artificial muscles 2c and 2d are arranged between the base plate 3a and the disk 6b while being pulled to cause an initial tension.

The arm 9a is connected to the disk 6b. The disk 6b rotates together with a rotation of the disk 6a and the arm 9a rotates together with the shaft 7a and the disks 6a and 6b. The actuator 1A is capable of exerting, to the outside using the arm 9a, a force generated by the artificial muscles 2a and 2b.

The pressure adjuster 20a, which changes the pressure of a fluid filled in the artificial muscles 2a and 2b, is connected to the artificial muscles 2a and 2b, constituting the position changer 26a. Specifically, the artificial muscle 2a is connected to the pressure adjuster 20a with the joint 16a and the pipe 17a interposed therebetween and the artificial muscle 2b is connected to the pressure adjuster 20a with the joint 16b and the pipe 17b interposed therebetween.

The controller 22a expands the artificial muscle 2a and contracts the artificial muscle 2b by increasing the pressure of the fluid using the pressure adjuster 20a so as to displace the displaceable portion 25a in a predetermined direction. Conversely, the controller 22a contracts the artificial muscle 2a and expands the artificial muscle 2b by decreasing the pressure of the fluid using the pressure adjuster 20a so as to displace the displaceable portion 25a in the direction opposite to the predetermined direction. Thus, the controller 22a controls the rotation position of the displaceable portion 25a.

Examples used as the pressure adjuster 20a include a syringe pump (reciprocating pump). A syringe pump is a pump including a cylindrical syringe and a movable pusher, as in the case of an injector, and a controller that controls the position of the pusher. The syringe pump pressurizes the inside of the syringe using the pusher to discharge the fluid or reduces the pressure in the syringe using the pusher to recover the fluid. Operating the syringe pump enables an adjustment of the amount or the pressure of the fluid filled in the artificial muscles 2a and 2b. Examples of the fluid used in this embodiment include a liquid such as water.

Here, a single syringe pump is used to cause the fluid of the same pressure or the same amount of the fluid to concurrently flow into or out of the artificial muscles 2a and 2b. Alternatively, multiple syringe pumps may be used to cause the fluid of the same pressure or the same amount of the fluid to concurrently flow into or out of the artificial muscles 2a and 2b.

On the other hand, the open-close valve 21a, which adjusts opening or closing of the path allowing communication between the portions of the fluid filled in the artificial muscles 2c and 2d, is connected to the artificial muscles 2c and 2d, constituting the stiffness changer 27a. Specifically, the artificial muscle 2c is connected to the open-close valve 21a with the joint 16c and the pipe 17c interposed therebetween. The artificial muscle 2d is connected to the open-close valve 21a with the joint 16d and the pipe 17d interposed therebetween. Specifically, the open-close valve 21a is disposed on the path of the pipe that connects the artificial muscles 2c and 2d to each other and that allows the fluid filled in the artificial muscles 2c and 2d to flow therethrough. The open-close valve 21a adjusts opening and closing of the path.

Figure 6:
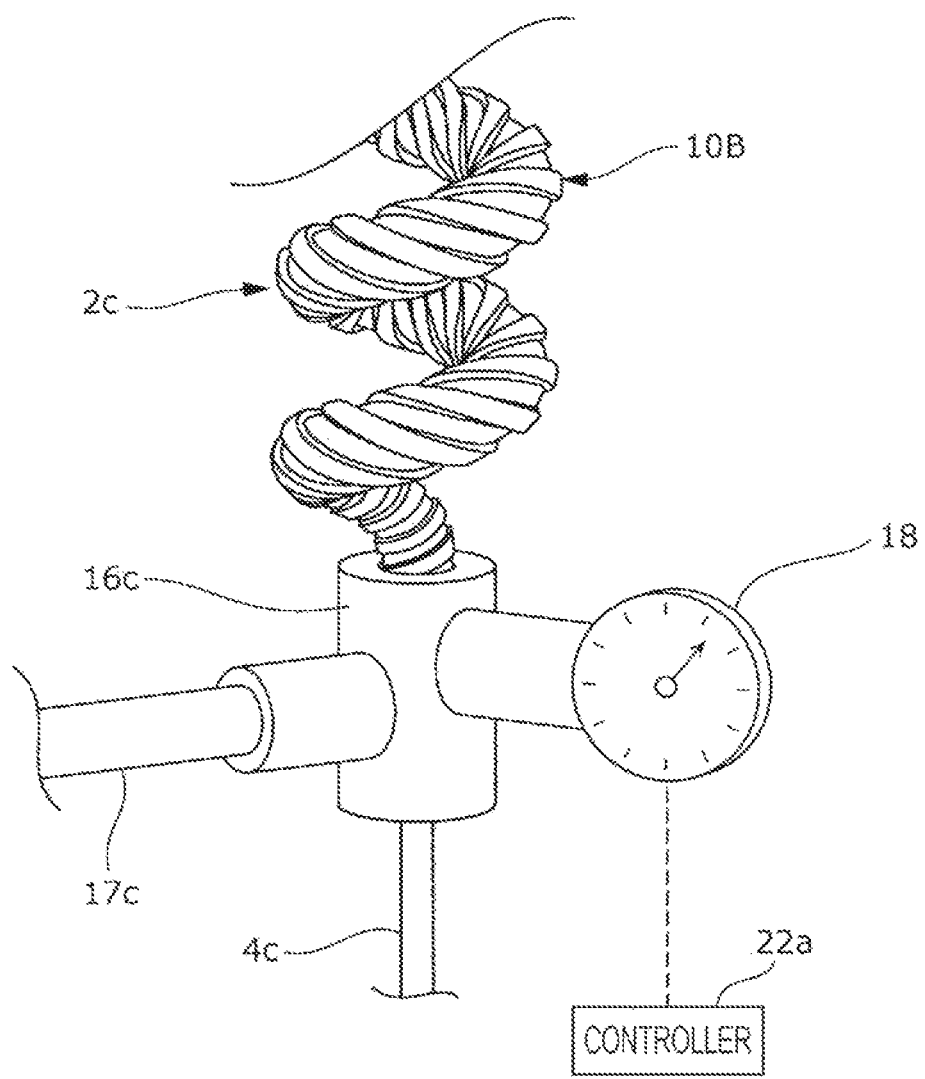
FIG. 6 illustrates an example of a joint and a pipe of an artificial muscle according to the first embodiment.

FIG. 6 illustrates an example of a joint and a pipe of an artificial muscle. FIG. 6 exemplarily illustrates a lower portion of the artificial muscle 2c. The artificial muscle 2c is connected to the joint 16c at its first end portion, at which it is connected to the base plate 3a. The pipe 17c, connected to the open-close valve 21a, and a first pressure-measuring portion 18 are connected to the joint 16c. The first pressure-measuring portion 18 measures the pressure of the fluid inside the artificial muscle 2c. Similarly, the artificial muscle 2d is connected to the joint 16d at its first end portion, at which it is connected to the base plate 3a. The pipe 17d, connected to the open-close valve 21a, and a second pressure-measuring portion 18 are connected to the joint 16d (which are not illustrated in FIG. 6). The second pressure-measuring portion 18 measures the pressure of the fluid inside the artificial muscle 2d.

The controller 22a detects the pressure of the fluid inside the artificial muscle 2c using the first pressure-measuring portion 18 and detects the pressure of the fluid inside the artificial muscle 2d using the second pressure-measuring portion 18. The controller 22a also controls opening or closing of the open-close valve 21a to control the amount of fluid flowing into or out of the artificial muscles 2c and 2d. Thus, the controller 22a controls the stiffness of the artificial muscles 2c and 2d, that is, the stiffness of the displaceable portion 25a in the rotation direction.

The actuator 1A according to this embodiment having this structure is thus capable of independently adjusting the position of the displaceable portion 25a using the pressure adjuster 20a and the stiffness of the displaceable portion 25a in the movement direction using the open-close valve 21a.

1.2 Artificial Muscle Structure

Now, the artificial muscles 2a to 2d according to this embodiment are described.

Figure 2A:
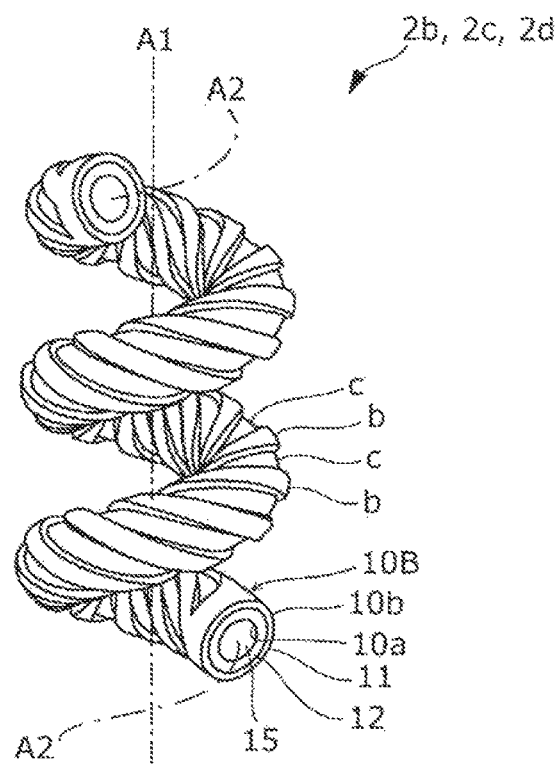
FIG. 2A is a part of an artificial muscle having a homochiral structure according to the first embodiment.
Figure 2B:
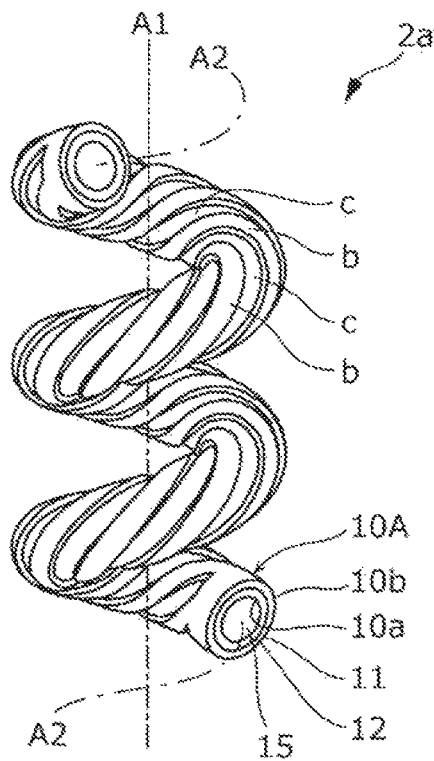
FIG. 2B is a part of an artificial muscle having a heterochiral structure according to the first embodiment.

FIG. 2A illustrates a portion of each of the artificial muscles 2b to 2d having the homochiral structure. FIG. 2B illustrates a portion of the artificial muscle 2a having the heterochiral structure.

The artificial muscles 2b to 2d having the homochiral structure is described first.

As illustrated in FIG. 2A, each of the artificial muscles 2b to 2d has a shape in which an elastic hollow tube 10B is coiled. The tube 10B is wound around an axis A1 of each of the artificial muscles 2b to 2d in the longitudinal direction. Multiple grooves c are formed in an outer circumferential surface 10b of the tube 10B helically around the axis A2 of the tube 10B. In each of the artificial muscles 2b to 2d, the tube 10B is right-hand coiled with respect to the axis A1 and each groove c extends right-hand helically with respect to the axis A2. Specifically, the direction in which the tube 10B is coiled and the direction in which each groove c extends helically coincide with each other. Such a structure is referred to as a homochiral structure.

On the other hand, in the artificial muscle 2a, each groove c extends left-hand helically with respect to the axis A2. Thus, the direction in which a tube 10A is coiled is opposite to the direction in which each groove c extends helically. Such a structure is referred to as a heterochiral structure.

In this embodiment, the tube 10A corresponds to a first tube and the tube 10B corresponds to a second tube, a third tube, and a fourth tube. In this embodiment, each groove c of the first tube corresponds to a first groove, each groove c of the second tube corresponds to a second groove, each groove c of the third tube corresponds to a third groove, and each groove c of the fourth tube corresponds to a fourth groove.

The detailed structure of the artificial muscles 2a to 2d is further described using the tube 10B as an example.

Figure 3:
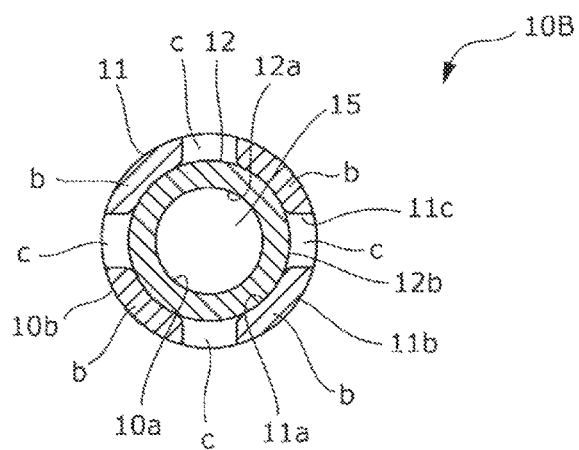
FIG. 3 is a cross-sectional view of a tube of an artificial muscle having a homochiral structure according to the first embodiment.

FIG. 3 is a cross-sectional view of the tube 10B of each of the artificial muscles 2b to 2d having the homochiral structure.

As illustrated in FIG. 3, the tube 10B includes a tubular first elastic member 11 and a tubular second elastic member 12, which is more flexible than the first elastic member 11. The second elastic member 12 is hollow and the hollow portion (inner side of an inner circumferential surface 12a) is filled with a fluid 15.

The first elastic member 11 has multiple through holes 11c that extend through an inner circumferential surface 11a and an outer circumferential surface 11b. The second elastic member 12 is disposed on the inner side of the first elastic member 11 to cover the through holes 11c. Thus, the grooves c are defined by the side surfaces of the through holes 11c of the first elastic member 11 and the surface (outer circumferential surface 12b) of the second elastic member 12. The first elastic member 11 and the second elastic member 12 are not bonded together.

The first elastic member 11 also includes multiple bone portions b arranged between grooves c adjacent to each other in the circumferential direction of the first elastic member 11. The bone portions b have an arc-shaped cross section and are disposed at intervals in the circumferential direction. The bone portions b include four bone portions b. These bone portions b extend helically around the axis A2 to helically form the four grooves c.

The first elastic member 11 is disposed on the outer side of the second elastic member 12. The ridgelines defined by the inner circumferential surface 11a of the first elastic member 11 and the side surface of the grooves c (through holes 11c) are chamfered. Although the ridgelines are rounded in this embodiment, the ridgelines may be tapered.

As described above, the second elastic member 12 is a member more flexible than the first elastic member 11. Examples of a flexible member here include a member made of a flexible material or a member having a flexible structure, such as an easily deformable member having a thin form or a wavy form.

Examples of the material of the first elastic member 11 include nylon. Examples of the material of the second elastic member 12 include silicone rubber. The materials of the elastic members 11 and 12 are, however, not limited to these materials and may be various other types of resin materials and/or metal materials. These elastic members 11 and 12 are formed from materials appropriately selected in consideration of desired properties such as pressure resistance, flexibility, and resistance (chemical resistance, solvent resistance, or oil resistance) to the fluid 15. For example, when the elastic members 11 and 12 are formed from resin materials, the artificial muscles 2b to 2d can have a light weight. Alternatively, when the elastic members 11 and 12 are formed from an engineering plastic having a high stiffness and/or a metal material, the artificial muscles 2b to 2d can be operated with a high pressure and at a low flow rate, so that the loss resulting from flow of the fluid 15 can be reduced.

Figure 4:
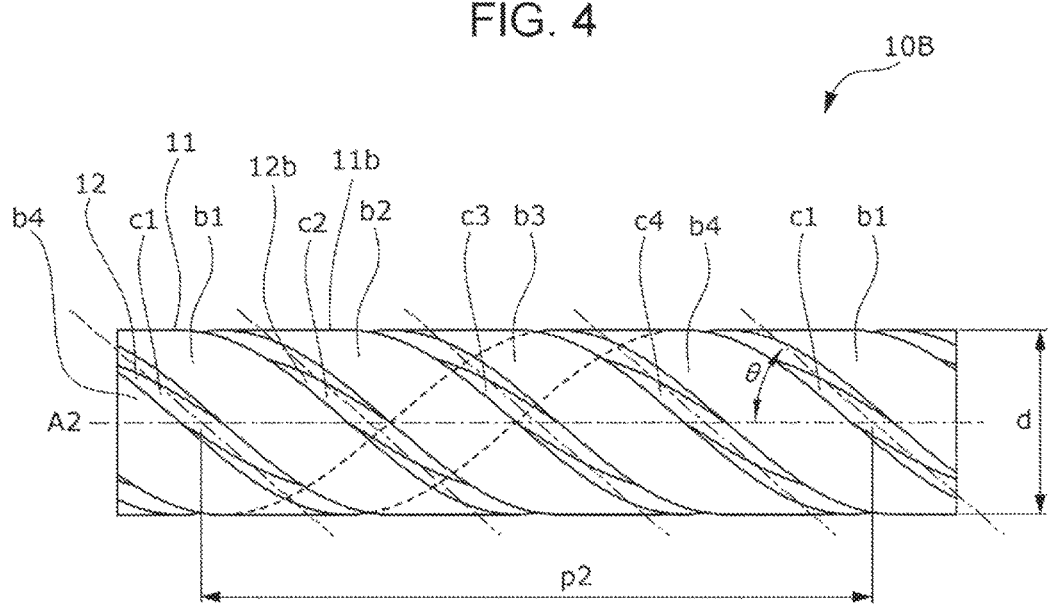
FIG. 4 illustrates the tube of the artificial muscle having a homochiral structure according to the first embodiment, where the tube is uncoiled and viewed from the front.
Figure 5:
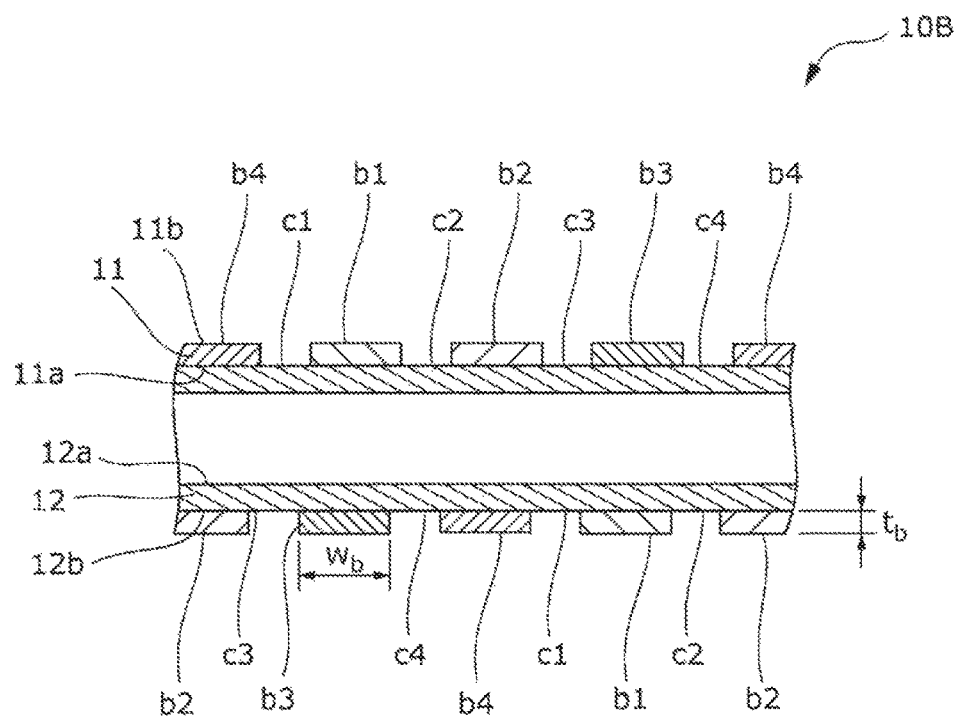
FIG. 5 is a vertical-sectional view of the tube of the artificial muscle illustrated in FIG. 4.

FIG. 4 illustrates the tube 10B of each of the artificial muscles 2b to 2d having a homochiral structure, where the tube 10B is uncoiled and viewed from the front. FIG. 5 is a vertical-sectional view of the tube 10B of each of the artificial muscles 2b to 2d illustrated in FIG. 4.

As illustrated in FIG. 4 and FIG. 5, the tube 10B has a multi-groove structure. Specifically, the tube 10B includes four grooves c (c1, c2, c3, and c4) and four bone portions b (b1, b2, b3, and b4). The grooves c1, c2, c3, and c4 extend parallel to one another and have uniform widths. The interval between adjacent grooves c (for example, an interval between the grooves c1 and c2) is appropriately designed in accordance with the number of the grooves c. The bone portions b1, b2, b3, and b4 also extend parallel to one another and have a uniform width wb. A thickness tb of each bone portion b is smaller than the width wb of the bone portion b.

The diameter (outer diameter) d of the tube 10B is, for example, 3.6 mm and the helix pitch p2 of each groove c is, for example, 10 mm.

Figure 7A:
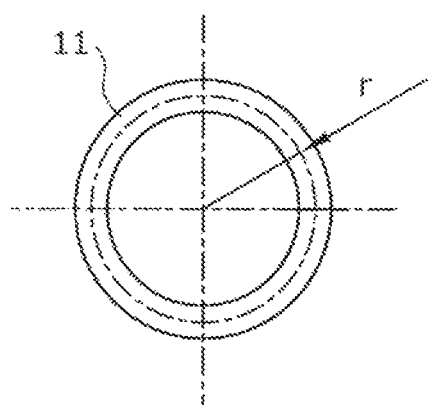
FIG. 7A is a sectional view of a bone portion of a first elastic member of the artificial muscle according to the first embodiment before a fluid inside the muscle is pressurized.
Figure 7B:
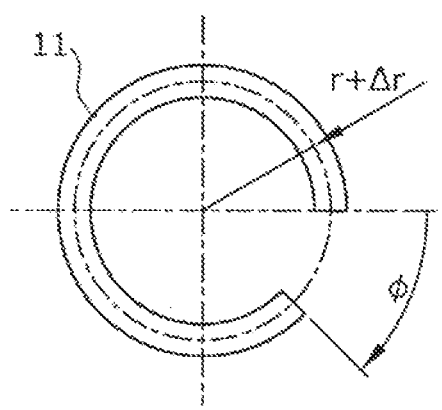
FIG. 7B is a sectional view of a modification of the bone portion of the first elastic member of the artificial muscle according to the first embodiment after the fluid inside the muscle is pressurized.

FIG. 7A is a sectional view of the bone portion b of the first elastic member 11 of each of the artificial muscles 2b to 2d before the fluid 15 inside the muscle is pressurized. FIG. 7B is a sectional view of deformation of the bone portion b of the first elastic member 11 of each of the artificial muscles 2b to 2d after the fluid 15 inside the muscle is pressurized.

FIG. 7A and FIG. 7B illustrate one turn of the bone portions b viewed in the direction of the axis A2.

As illustrated in FIG. 7A, before the fluid 15 is pressurized, the radius of each bone portion b is r. After the fluid 15 is pressurized, the first elastic member 11 of the tube 10B expands (deforms) radially due to the pressure transmitted through the second elastic member 12 of the tube 10B, and in response, the radius of the bone portion b is changed to $r+\Delta r$, as illustrated in FIG. 7B. Here, each bone portion b receives a twist of an angle $\phi=2\pi\Delta r/(r+\Delta r)$ per turn. This twist distorts the entirety of the tube 10B, mainly the first elastic member 11, about the axis A2.

Figure 8A:
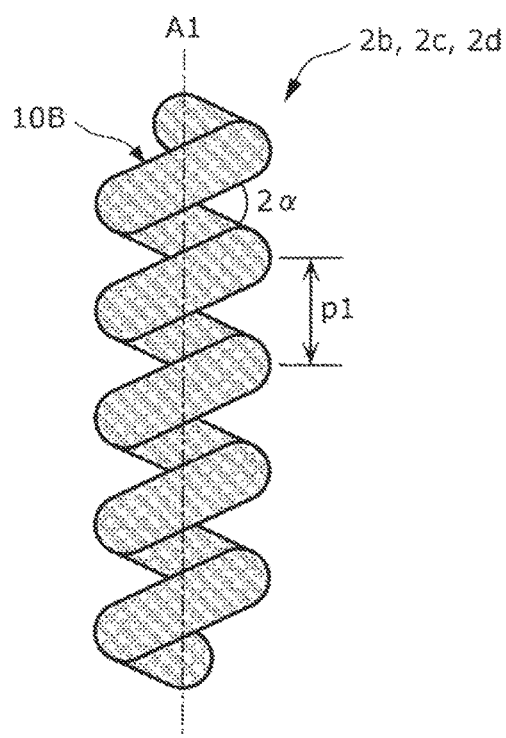
FIG. 8A is a schematic diagram of the artificial muscle having a homochiral structure according to the first embodiment before the fluid inside the muscle is pressurized.
Figure 8B:
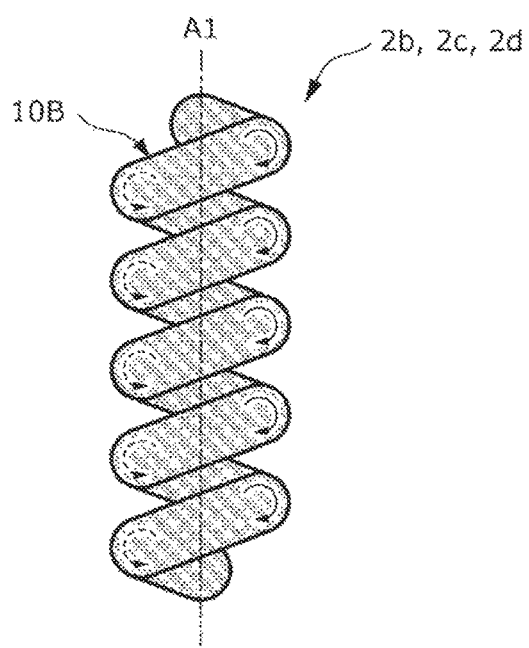
FIG. 8B is a schematic diagram of the artificial muscle having a homochiral structure according to the first embodiment when the muscle is contracted after the fluid inside the muscle is pressurized.

FIG. 8A is a schematic diagram of the artificial muscles 2b to 2d having a homochiral structure before the fluid 15 inside the muscle is pressurized. FIG. 8B is a schematic diagram of the artificial muscles 2b to 2d having a homochiral structure when the muscle is contracted after the fluid 15 inside the muscle is pressurized.

In the artificial muscles 2b to 2d having the homochiral structure, the grooves c of the tube 10B extend right-hand helically with respect to the axis A2 and the artificial muscles 2b to 2d are right-hand wound with respect to the axis A1. Thus, as illustrated in FIG. 8B, a twist that occurs in the tube 10B is exerted so as to contract the artificial muscles 2b to 2d in the direction of the axis A1.

Specifically, a left-hand twist is exerted on the entirety of the tube 10B around the axis A2 in response to the expansion due to pressurizing. Since the artificial muscles 2b to 2d are right-hand wound about the axis A1, when the near side is viewed from the back side and when an attention is paid to the right side of the artificial muscles 2b to 2d illustrated in FIG. 8B, the tube 10B is left-hand twisted so that the near side is rotated in the direction of the solid arrows. When, on the other hand, an attention is paid to the left side of the artificial muscles 2b to 2d, the tube 10B is left-hand twisted so that the back side is rotated in the direction of the broken arrows. Thus, the twist occurring throughout the length of the tube 10B is exerted so as to reduce the pitch angle α of the tube 10B (reduce the coil pitch p1 of the tube 10B), so that the length of the artificial muscles 2b to 2d is reduced.

When pressurizing of the fluid 15 is stopped, the elastic force of the first elastic member 11 and the second elastic member 12 recovers the tube 10B from the radial deformation or the twist, so that the length of the artificial muscles 2b to 2d is recovered.

In the actuator 1A according to this embodiment, the artificial muscles 2c and 2d are formed from the same material and have the same shape. Specifically, the artificial muscles 2c and 2d have the same coil diameter and the same coil pitch in relaxed length and are both formed from the tube 10B.

Now, the tube 10A that is left-hand wound around the axis A1 is described.

In the artificial muscle 2a having the heterochiral structure, the grooves c of the tube 10A extend left-hand helically with respect to the axis A2 and the artificial muscle 2a is right-hand wound with respect to the axis A1. Thus, when the fluid 15 inside the tube 10A is pressurized, a right-hand twisting force is exerted on the tube 10A so as to expand the artificial muscle 2a in the direction of the axis A1.

Figure 9A:
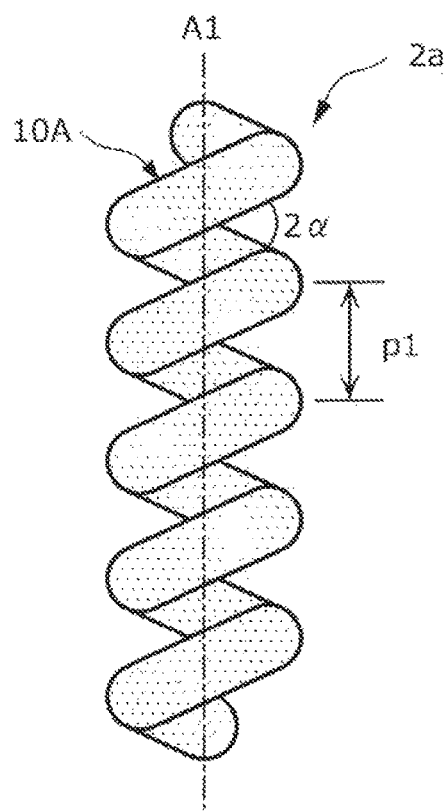
FIG. 9A is a schematic diagram of the artificial muscle having a heterochiral structure according to the first embodiment before the fluid inside the muscle is pressurized.
Figure 9B:
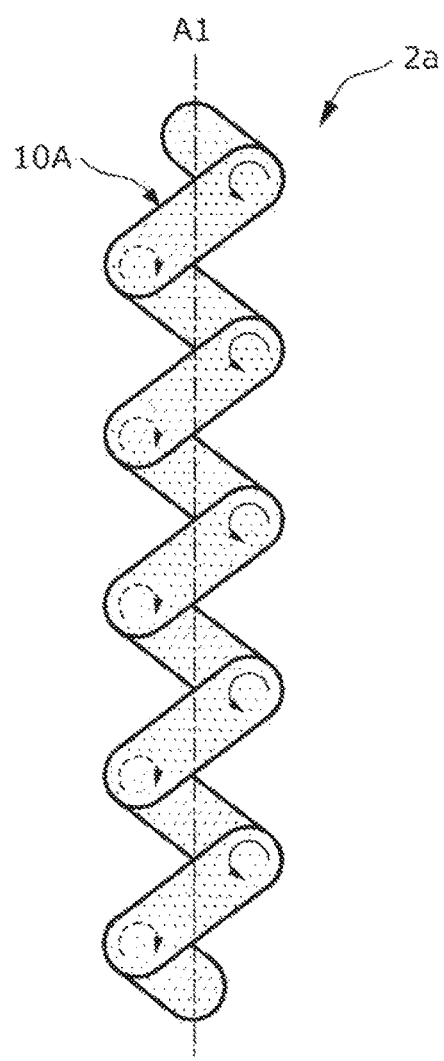
FIG. 9B is a schematic diagram of the artificial muscle having a heterochiral structure according to the first embodiment when the muscle is expanded after the fluid inside the muscle is pressurized.

FIG. 9A is a schematic diagram of the artificial muscle 2a having a heterochiral structure before the fluid 15 inside the muscle is pressurized. FIG. 9B is a schematic diagram of the artificial muscle 2a having a heterochiral structure when the muscle is expanded after the fluid 15 inside the muscle is pressurized. FIG. 9A and FIG. 9B eliminate the illustration of the grooves c.

In the artificial muscle 2a, each groove c extends left-hand helically. Thus, a right-hand twist is exerted on the entirety of the tube 10A around the axis A2 of the tube 10A in response to the expansion resulting from pressurizing. Since the tube 10A is right-hand wound around the axis A1, when the near side is viewed from the back side and when an attention is paid to the right side of the artificial muscle 2a illustrated in FIG. 9B, the tube 10A is right-hand twisted so that the near side is rotated in the direction of the solid arrows. When, on the other hand, an attention is paid to the left side of the artificial muscle 2a, the tube 10A is right-hand twisted so that the back side is rotated in the direction of the broken arrows. Thus, the twist exerted throughout the length of the tube 10A is exerted so as to increase the pitch angle α of the tube 10A (increase the coil pitch p1 of the tube 10A) and increases the length of the artificial muscle 2a.

In the actuator 1A according to this embodiment, the artificial muscles 2a and 2b are formed from the same material and have the same coil diameter and the same coil pitch in relaxed length. When the tube 10A of the artificial muscle 2a and the tube 10B of the artificial muscle 2b are uncoiled, the tubes 10A and 10B have shapes that are plane symmetric reflections of each other.

The above characteristics result from the direction in which the tubes 10A and 10B are coiled and the direction in which each groove c extends helically. The structure illustrated in FIG. 3 is not the only possible structure. For example, the second elastic member 12 may be disposed on the outer circumference of the first elastic member 11 or inside the grooves c of the first elastic member 11. Alternatively, the second elastic member 12 may be integrated with the first elastic member 11.

In the actuator 1A, the tube 10A of the artificial muscle 2a has a shape of a plane symmetric reflection of the shape of the tube 10B of the artificial muscle 2b when the tubes 10A and 10B are uncoiled. However, this is not the only possible structure. When the direction in which the artificial muscle 2a is coiled is opposite to the direction in which the artificial muscle 2b is coiled, the tube 10A may have the same shape as the tube 10B when the tubes 10A and 10B are uncoiled.

1.3 Operation and Stiffness of Actuator

Now, the operation and the stiffness of the actuator 1A are roughly described. Assuming that expansion in the direction of the axis A2 resulting from pressurizing, expansion of the first elastic member 11, and compression of the second elastic member 12 are negligible, the properties of the artificial muscles 2a to 2d can be expressed as in Formula 1 and Formula 2, below, provided that a state where a bias pressure is applied to the fluid 15 and no tension is exerted is defined as an initial state.

$$\Delta L = \frac{1}{k}(F \mp A\Delta p) \qquad \text{(Formula 1)}$$

$$\Delta V = \frac{A}{k}(\mp F + A\Delta p) = \mp A\Delta L \qquad \text{(Formula 2)}$$

Here, ΔL denotes expansion of the artificial muscles 2a to 2d from the initial state, ΔV denotes a change in capacity of the hollow portion of the artificial muscles 2a to 2d filled with the fluid 15 from the initial state, k denotes a spring constant of the structure of the artificial muscles 2a to 2d having a coil shape, F denotes the tension exerted on the artificial muscles 2a to 2d in an elongation direction, Δp denotes a pressure change from a bias pressure, and A denotes a positive coefficient that depends on the structure or the material of the artificial muscles 2a to 2d. The coefficient A of the artificial muscles 2b to 2d having the homochiral structure has a minus sign and the coefficient A of the artificial muscle 2a having the heterochiral structure has a plus sign. When bearing the tension, the artificial muscles 2a to 2d expand to increase their length. In addition, when pressurized, the artificial muscles 2b to 2d having the homochiral structure contract to increase their length and the artificial muscle 2a having the heterochiral structure expand to decrease their length. On the other hand, although pressurizing the artificial muscles 2a to 2d expands the hollow portion, the tension contracts the hollow portion of the artificial muscles 2b to 2d having the homochiral structure and expands the hollow portion of the artificial muscle 2a having the heterochiral structure.

When the stiffness of the artificial muscles 2a to 2d is calculated on the basis of Formula 1 and Formula 2, Formula 3 is obtained.

$$\frac{F}{\Delta L} = k \pm A\frac{\Delta p}{\Delta L} = k - A^2 \frac{\Delta p}{\Delta V} \quad \text{(Formula 3)}$$

The pressure change $\Delta p/\Delta V$ per change in capacity is zero when the fluid 15 is allowed to freely flow in and out and thus F/$\Delta$L=k. In this case, F/$\Delta$L expresses the spring constant of the artificial muscles 2c and 2d without receiving the effect of the fluid 15. When the artificial muscles 2c and 2d having the same spring constant are coupled together and the tension is exerted on either one of the artificial muscles 2c and 2d, $\Delta p/\Delta V=-k/A^2$ and thus F/$\Delta$L=2 k. In this case, flowing in or out of the fluid 15 deforms the coupled artificial muscles 2c and 2d and increases the stiffness. To completely interrupt flowing in or out of the fluid 15, $\Delta p/\Delta V=-\infty$ and thus F/$\Delta$L=$\infty$. This value is obtained because the parameters, such as the expansion in the direction of the axis A2 due to pressurizing, the expansion of the first elastic member 11, and compression of the second elastic member 12, are neglected. In practice, this value is to be a finite value. In this manner, completely interrupting flowing in or out of the fluid 15 enhances the stiffness.

Now, the operation of the position changer 26a including a combination of the artificial muscles 2a and 2b is described.

FIG. 10A is a schematic diagram of the position changer 26a in an initial state. FIG. 10B is a schematic diagram of the position changer 26a in the state where the fluid 15 inside the artificial muscles 2a and 2b is pressurized.

The state illustrated in FIG. 10A is the state where the initial tension is exerted on the artificial muscles 2a and 2b through the winding wire 5a. Here, the expansion $\Delta$L of both artificial muscles 2a and 2b is F0/k when the initial tension is assumed to be F0. When the pressure is changed by $\Delta$p from this state using the pressure adjuster 20a, the expansion $\Delta$L of the artificial muscle 2a is changed to (F0+A$\Delta$p)/k and the expansion $\Delta$L of the artificial muscle 2b is changed to (F0–A$\Delta$p)/k. These deformations rotate the disk 6a as illustrated in FIG. 10B. Since the sum of the expansions of the artificial muscles 2a and 2b is constant, the tension remains unchanged from F0. A neutral angle (balanced angle) in the state where the disk 6a and the arm 9a integrated with the disk 6a are bearing no load is rendered adjustable by controlling the pressure change $\Delta$p using the pressure adjuster 20a. On the other hand, the stiffness F/$\Delta$L when the arm 9a is rotated by an external force from the state of the neutral angle is changed to k, which is constant regardless of the position of the neutral angle, since the fluid 15 is allowed to freely flow in and out of the artificial muscles 2a and 2b as a result of keeping the pressure change $\Delta$p constant. At this time, the initial tension that constantly satisfies F0>A$\Delta$p is exerted on the artificial muscles 2a and 2b so that the winding wire 5a is prevented from becoming slack.

Now, the operation of the stiffness changer 27a including a combination of the artificial muscles 2c and 2d is described.

Figure 11A:
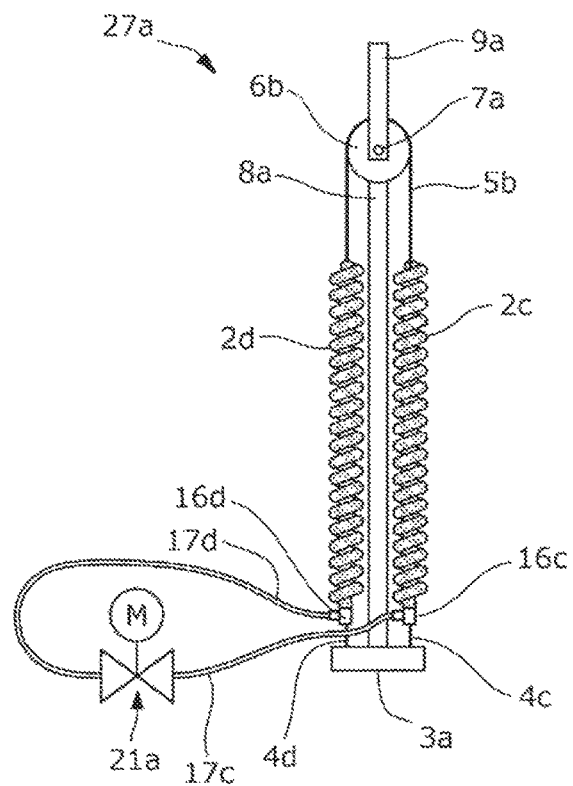
FIG. 11A is a schematic diagram of the stiffness changer according to the first embodiment in a neutral state.
Figure 11B:
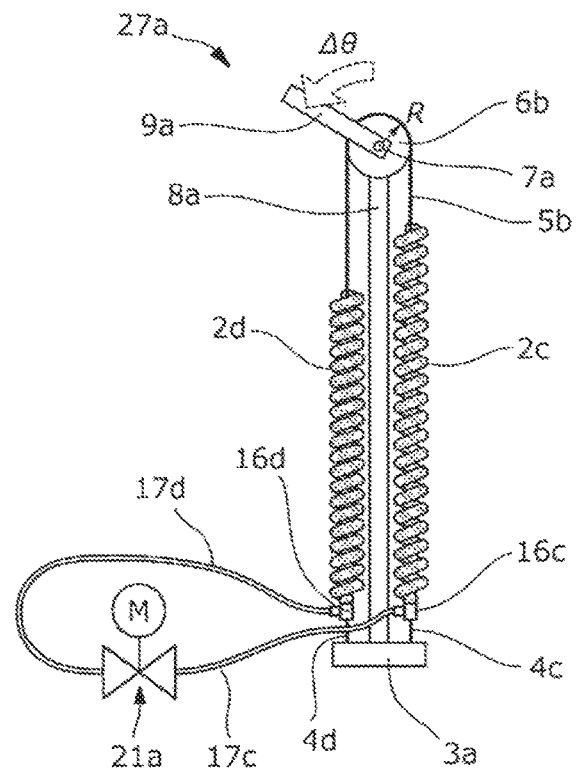
FIG. 11B is a schematic diagram of the stiffness changer according to the first embodiment on which an external force is exerted.

FIG. 11A is a schematic diagram of the stiffness changer 27a in a neutral state. FIG. 11B is a schematic diagram of the stiffness changer 27a on which an external force is exerted.

In the state illustrated in FIG. 11B, the disk 6b is rotated counterclockwise by an angle $\Delta\theta$ by an external force. Thus, the expansion $\Delta$L of the artificial muscle 2c increases and the expansion $\Delta$L of the artificial muscle 2d decreases by the increase of the expansion $\Delta$L of the artificial muscle 2c. In the state where the open-close valve 21a is rendered open, the fluid 15 that has flowed out of the artificial muscle 2c directly flows into the artificial muscle 2d. Thus, the pressure of the fluid 15 is not changed by the rotation of the disk 6b.

Now, the stiffness K against a rotation of the disk 6b is defined as satisfying T/R=–KR$\Delta\theta$. Here, T denotes the torque exerted on the disk 6b, R denotes the radius of the disk 6b, and $\Delta\theta$ denotes an angular change from the neutral angle. In the state where the open-close valve 21a is rendered open, K=2 k. On the other hand, in the state where the open-close valve 21a is closed, F/$\Delta$L=$\infty$, and thus K=$\infty$. In practice, the stiffness is finite, as in the case of the stiffness of the artificial muscles 2c and 2d. Thus, the stiffness of the artificial muscles 2c and 2d when the flowing in and out of the fluid 15 is interrupted is assumed to be $\alpha_1$k. The coefficient $\alpha_1$ is, for example, 10. At this time, the rotation stiffness K is changeable within the range of 2 k to 2$\alpha_1$k regardless of the neutral angle by adjusting opening and closing of the open-close valve 21a.

Now, the operation and the stiffness of the antagonistic actuator 1A illustrated in FIG. 1 are described. In the actuator 1A, by adjusting opening and closing of the open-close valve 21a, the rotation stiffness K is adjustable within the range of 4 k to (2 k+2$\alpha_1$k), which are obtained by adding a contribution 2 k to 2$\alpha_1$k of the artificial muscles 2c and 2d to a contribution 2 k of the artificial muscles 2a and 2b. For example, when the coefficient $\alpha_1$ is 10, the stiffness is adjustable within the range of 4 k to 22 k.

In an adjustment of the neutral angle (position), in consideration of the effect of the spring constant k intrinsic to the artificial muscles 2c and 2d, the pressure change $\Delta$p of the artificial muscles 2c and 2d is required to be twice that of the structure of the artificial muscles 2a and 2b. Here, the neutral angle can be fully adjustable by controlling the pressure change $\Delta$p using the pressure adjuster 20a. Thus, the actuator 1A capable of independently adjusting the position change and the stiffness can be provided.

1.4 Method for Driving Actuator

Now, a method for driving the actuator 1A is schematically described.

Figure 12:
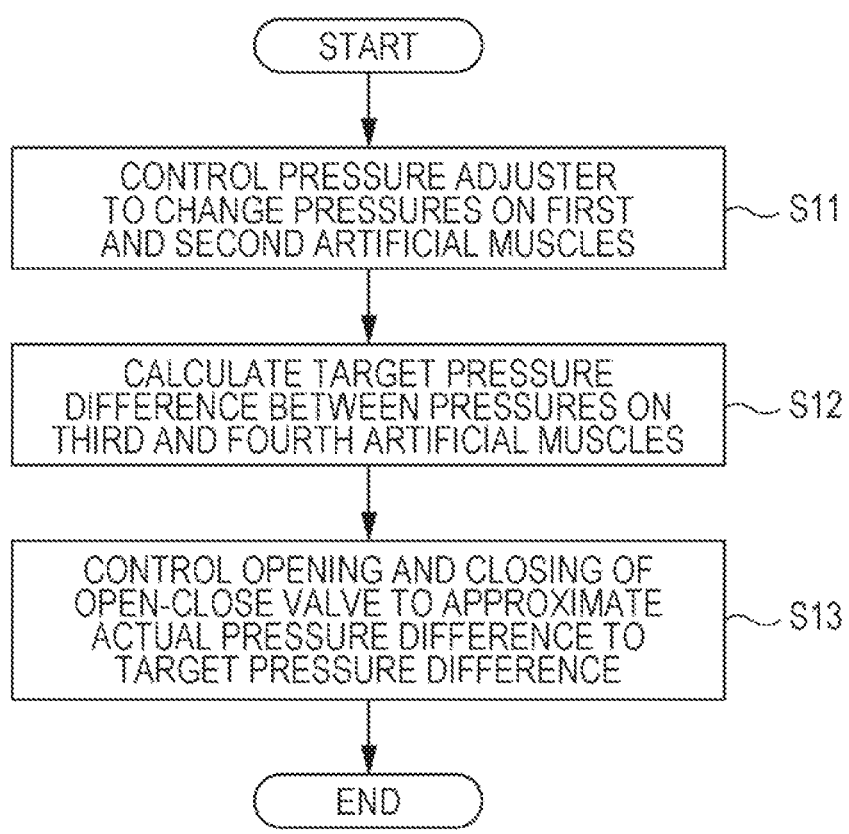
FIG. 12 is a flowchart of a method for driving an actuator according to a first embodiment.

FIG. 12 is a flowchart of a method for driving the actuator 1A.

The method for driving the actuator 1A includes the following steps S11 to S13.

S11 is a step of changing the pressure of the fluid 15 in the artificial muscle 2a and the fluid 15 in the artificial muscle 2b using the pressure adjuster 20a in response to a position command issued to change the position of the displaceable portion 25a to a target position.

S12 is a step of calculating a target pressure difference between the fluid 15 in the artificial muscle 2c and the fluid 15 in the artificial muscle 2d on the basis of the position command and a stiffness command issued to change the stiffness of the displaceable portion 25a to a target stiffness.

S13 is a step of comparing the target pressure difference and the actual pressure difference between the fluid 15 in the artificial muscle 2c and the fluid 15 in the artificial muscle 2d and approximating the actual pressure difference to the target pressure difference by controlling opening and closing of the open-close valve 21a.

First, the controller 22a calculates the pressure $\Delta$p that satisfies a neutral angle command obtained by using the coefficient A, the spring constant k, and the radius R, measured in advance. For example, $\Delta$p=2 kR$\Delta\theta$/A when an angle rotated counterclockwise by Δθ from the neutral angle when Δp=0 is used as a target neutral angle.

Subsequently, the controller 22a controls the pressure adjuster 20a so that the pressure change Δp is exerted on the artificial muscles 2a and 2b.

In addition, the controller 22a calculates a target pressure difference between the artificial muscles 2c and 2d required for the current angle on the basis of the obtained neutral angle command (position command) and the stiffness command.

Thereafter, the controller 22a compares the target pressure difference and the actual pressure difference between the artificial muscles 2c and 2d and controls opening and closing of the open-close valve 21a to approximate the actual pressure difference to the target pressure difference. For example, when the actual pressure difference is below the target pressure difference, the controller 22a closes the open-close valve 21a. Conversely, when the actual pressure difference exceeds the target pressure difference, the controller 22a opens the open-close valve 21a. Here, the actual pressure difference is measured by a pressure sensor (first pressure-measuring portion 18) disposed at the artificial muscle 2c and a pressure sensor (second pressure-measuring portion 18) disposed at the artificial muscle 2d.

By repeating these steps S11 to S13, the neutral angle and the stiffness of the actuator 1A are changed in accordance with the commands.

When the pressures on the artificial muscles 2c and 2d are reduced to such a level that the artificial muscles 2c and 2d cannot operate stably, such as a negative pressure, and or increased to a level that affects the lives of the artificial muscles 2c and 2d, the controller 22a may be released to allow the pressures to fall within a predetermined range.

1.5 Modifications of Actuator

Hereinbelow, modifications of this embodiment are described.

For example, as long as the pipe connection relationship in the actuator 1A remains the same, the positions of the artificial muscles 2a and 2c illustrated in FIG. 1 may be swapped with each other, or, the positions of the artificial muscles 2b and 2d may be swapped with each other. Specifically, the actuator 1A suffices if the artificial muscles 2a and 2b are antagonistically arranged with the displaceable portion 25a interposed therebetween and the artificial muscles 2c and 2d are antagonistically arranged with the displaceable portion 25a interposed therebetween.

In this embodiment, for example, the tube of the artificial muscle 2a is right-hand coiled, each groove of the artificial muscle 2a extends left-hand helically, the tube of the artificial muscle 2b is right-hand coiled, and each groove of the artificial muscle 2b extends right-hand helically. However, the tube of the artificial muscle 2b may be left-hand coiled and each groove of the artificial muscle 2b may extend left-hand helically. In the case where the tube of the artificial muscle 2a is left-hand coiled and each groove of the artificial muscle 2a extends right-hand helically, the tube of the artificial muscle 2b may be left-hand coiled and each groove of the artificial muscle 2b may extend left-hand helically or, the tube of the artificial muscle 2b may be right-hand coiled and each groove of the artificial muscle 2b may extend right-handed helically.

In this embodiment, for example, both artificial muscles 2c and 2d have a homochiral structure. However, both artificial muscles 2c and 2d may have a heterochiral structure.

In this embodiment, for example, all the artificial muscles 2a to 2d are made of the same material and have the same size. However, this is not the only possible structure. The pair of the artificial muscles 2a and 2b may be made of a material different from the material of the pair of the artificial muscles 2c and 2d or may have a size different from that of the pair of the artificial muscles 2c and 2d.

In this embodiment, for example, the winding wire 5a is wound around the outer periphery of the disk 6a. Alternatively, the winding wire 5a may be directly attached to the outer edge of the disk 6a. The winding wire 5b may be similarly attached to the disk 6b. In addition, the disks 6a and 6b may have different diameters.

Second Embodiment 2.1 Structure of Actuator

An actuator 1B according to a second embodiment is different from the actuator 1A according to the first embodiment in terms that artificial muscles 2e and 2g are arranged in a line and artificial muscles 2f and 2h are arranged in a line.

Figure 13:
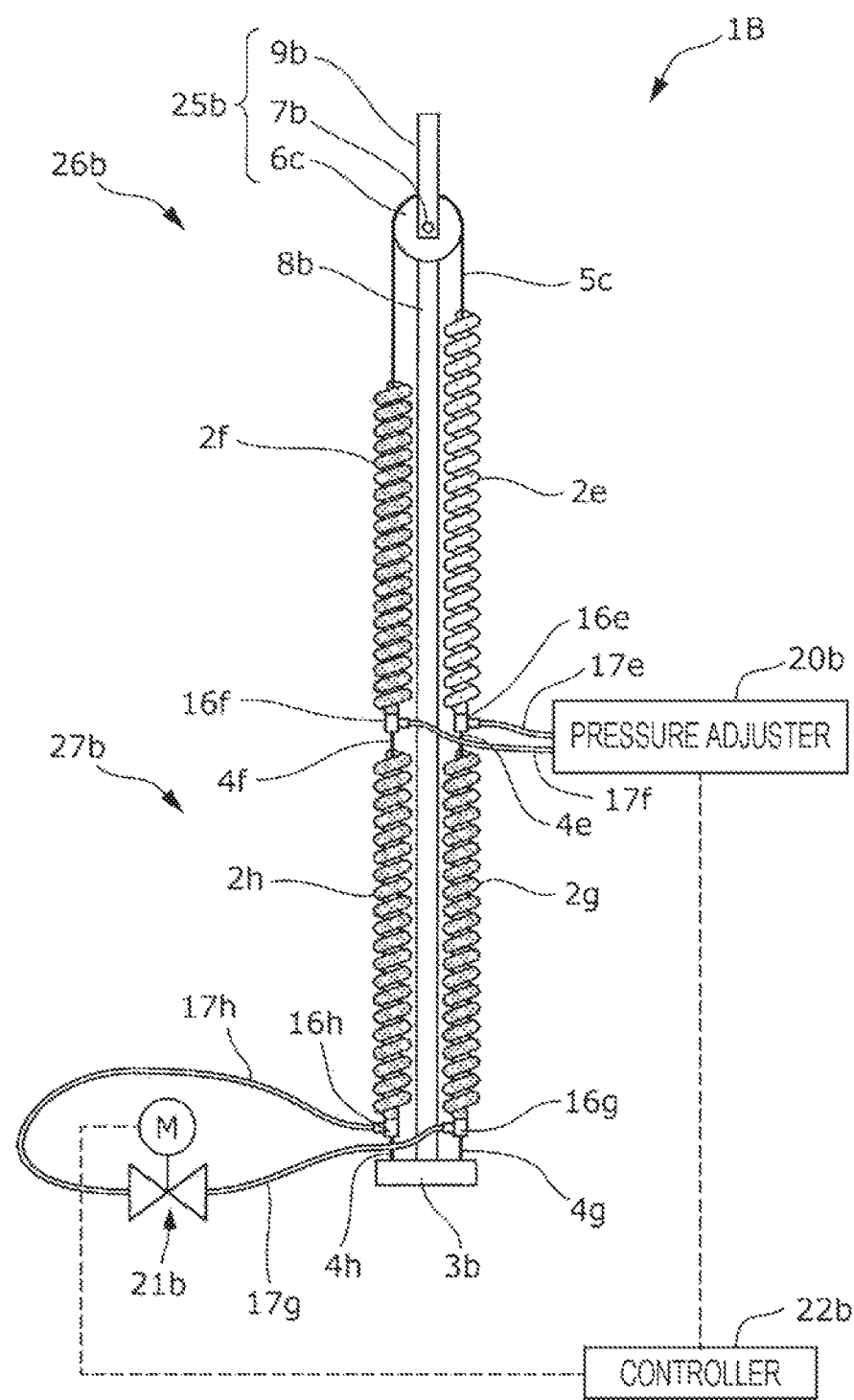
FIG. 13 is a schematic diagram of an actuator according to a second embodiment.

FIG. 13 is a schematic diagram of the actuator 1B according to the second embodiment.

First, the schematic structure of the actuator 1B is described.

The actuator 1B includes a first artificial muscle 2e and a third artificial muscle 2g, which are arranged in a line, and a second artificial muscle 2f and a fourth artificial muscle 2h, which are arranged in a line. Hereinbelow, the first artificial muscle 2e, the second artificial muscle 2f, the third artificial muscle 2g, and the fourth artificial muscle 2h are also referred to as the artificial muscles 2e, 2f, 2g, and 2h. The artificial muscles 2e to 2h are tubular and filled with the fluid 15. The artificial muscles 2e to 2h contract or expand in accordance with a change in pressure of the fluid 15 inside themselves. The artificial muscle 2e has a heterochiral structure, as in the case of the above artificial muscle 2a, and the artificial muscles 2f, 2g, and 2h have a homochiral structure, as in the case of the above artificial muscles 2b, 2c, and 2d.

The actuator 1B includes a position changer 26b, which changes the position of a displaceable portion 25b, and a stiffness changer 27b, which changes the stiffness of the displaceable portion 25b in a movement direction.

The displaceable portion 25b includes a disk 6c, a shaft 7b, and an arm 9b, which rotate integrally. The displaceable portion 25b is disposed on a path connecting the artificial muscles 2e and 2f to each other. The displaceable portion 25b is rendered displaceable in a predetermined direction (rotation direction) when the artificial muscles 2e and 2f exert a force in a tangential direction of the disk 6c. The position changer 26b includes the artificial muscles 2e and 2f, coupling wires 4e and 4f, a winding wire 5c, joints 16e and 16f, pipes 17e and 17f, and a pressure adjuster 20b. The stiffness changer 27b includes the artificial muscles 2g and 2h, coupling wires 4g and 4h, joints 16g and 16h, pipes 17g and 17h, and an open-close valve 21b.

The actuator 1B also includes a controller 22b, which drives a pressure adjuster 20b and controls opening or closing of the open-close valve 21b.

Now, components of the actuator 1B are described.

A first end of the artificial muscle 2e is connected to the artificial muscle 2g with the joint 16e and the coupling wire 4e interposed therebetween. A first end of the artificial muscle 2f is connected to the artificial muscle 2h with the joint 16f and the coupling wire 4f interposed therebetween. Second ends of the artificial muscles 2e and 2f are respectively connected to both ends of the winding wire 5c. The winding wire 5c is wound around the periphery of the disk (sprocket) 6c. The shaft (rotation shaft) 7b is fixed to a center portion of the disk 6c. The disk 6c is rotatable about the axis of the shaft 7b together with the shaft 7b. The shaft 7b is rotatably supported by a post 8b, which is fixed onto a base plate 3b. The artificial muscles 2e and 2f are arranged between the artificial muscles 2g and 2h and the disk 6c while being pulled to cause an initial tension. The disk 6c rotates in accordance with the movement of the winding wire 5c resulting from the contraction and expansion of the artificial muscles 2e and 2f.

A first end of the artificial muscle 2g is connected to the base plate 3b with the joint 16g and the coupling wire 4g interposed therebetween. A first end of the artificial muscle 2h is connected to the base plate 3b with the joint 16h and the coupling wire 4h interposed therebetween. Second ends of the artificial muscles 2g and 2h are respectively connected to the first ends of the artificial muscles 2e and 2f. The artificial muscles 2g and 2h are arranged between the base plate 3b and the artificial muscles 2e and 2f while being pulled to cause an initial tension.

The arm 9b is connected to the disk 6c. The arm 9b rotates together with the shaft 7b and the disk 6c. The actuator 1B is formed so as to be capable of exerting, to the outside using the arm 9b, a force generated by the artificial muscles 2e and 2f.

The pressure adjuster 20b, which changes the pressure of the fluid 15 filled in the artificial muscles 2e and 2f, is connected to the artificial muscles 2e and 2f, constituting the position changer 26b. Specifically, the artificial muscle 2e is connected to the pressure adjuster 20b with the joint 16e and the pipe 17e interposed therebetween and the artificial muscle 2f is connected to the pressure adjuster 20b with the joint 16f and the pipe 17f interposed therebetween.

The controller 22b expands the artificial muscle 2e and contracts the artificial muscle 2f by increasing the pressure of the fluid 15 using the pressure adjuster 20b so as to displace the displaceable portion 25b in a predetermined direction. Conversely, the controller 22b contracts the artificial muscle 2e and expands the artificial muscle 2f by decreasing the pressure of the fluid 15 using the pressure adjuster 20b so as to displace the displaceable portion 25b in the direction opposite to the predetermined direction. Thus, the controller 22b controls the rotation position of the displaceable portion 25b.

Examples used as the pressure adjuster 20b include a syringe pump (reciprocating pump). A syringe pump is a pump including a cylindrical syringe and a movable pusher, as in the case of an injector, and a controller that controls the position of the pusher. The syringe pump pressurizes the inside of the syringe using the pusher to discharge the fluid or reduces the pressure in the syringe using the pusher to recover the fluid. Operating the syringe pump enables an adjustment of the amount and/or the pressure of the fluid filled in the artificial muscles 2e and 2f. Examples of the fluid 15 used in this embodiment include a liquid such as water.

Here, a single syringe pump is used to cause the fluid 15 of the same pressure or the same amount of the fluid 15 to concurrently flow into or out of the artificial muscles 2e and 2f. Alternatively, multiple syringe pumps may be used to cause the fluid 15 of the same pressure or the same amount of the fluid 15 to concurrently flow into or out of the artificial muscles 2e and 2f.

On the other hand, the open-close valve 21b, which adjusts opening or closing of the path allowing communication between the portions of the fluid filled in the artificial muscles 2g and 2h, is connected to the artificial muscles 2g and 2h, constituting the stiffness changer 27b. Specifically, the artificial muscle 2g is connected to the open-close valve 21b with the joint 16g and the pipe 17g interposed therebetween. The artificial muscle 2h is connected to the open-close valve 21b with the joint 16h and the pipe 17h interposed therebetween. Specifically, the open-close valve 21b is disposed on the path of the pipe that connects the artificial muscles 2g and 2h to each other and that allows the fluid 15 filled in the artificial muscles 2g and 2h to flow therethrough. The open-close valve 21b adjusts opening and closing of the path.

The controller 22b controls opening or closing of the open-close valve 21b to control the amount of the fluid 15 flowing into or out of the artificial muscles 2g and 2h. Thus, the controller 22b controls the stiffness of the artificial muscles 2g and 2h, that is, the stiffness of the displaceable portion 25b in the rotation direction.

The actuator 1B according to this embodiment is thus capable of independently adjusting the position of the displaceable portion 25b using the pressure adjuster 20b and the stiffness of the displaceable portion 25b in the movement direction using the open-close valve 21b.

2.2 Operation of Actuator

Now, the operation of the actuator 1B is schematically described. The characteristics of the artificial muscles 2e to 2h are the same as those in the case of the first embodiment. In the second embodiment, the spring constant of the artificial muscles 2e and 2f is denoted by k and the spring constant of the artificial muscles 2g and 2h is denoted by $\beta_1 k$. The coefficient $\beta_1$ is, for example, 0.1. By adjusting opening and closing of the open-close valve 21b, the rotation stiffness K is adjustable within the range of $2\beta_1 k/(1+\beta_1)$ to $2\alpha_1 \beta_1 k/(1+\alpha_1 \beta_1)$, which are obtained by adding a contribution $2\beta_1 k$ to $2\alpha_1 \beta_1 k$ of the artificial muscles 2g and 2h to a contribution 2 k of the artificial muscles 2e and 2f. When the coefficient $\alpha_1=10$ and the coefficient $\beta_1=0.1$, the rotation stiffness K is adjustable within the range of 0.1818 k to k.

In an adjustment of the neutral angle, the neutral angle can be adjusted by controlling the pressure change $\Delta p$ using the pressure adjuster 20b. The pressure change $\Delta p$ at this time is the same as that in the case of the artificial muscles 2e and 2f. Thus, the actuator 1B capable of independently adjusting the position change and the stiffness can be provided.

2.3 Modification of Actuator

Hereinbelow, a modification of this embodiment is described.

For example, as long as the pipe connection relationship in the actuator 1B remains the same, the positions of the artificial muscles 2e and 2g illustrated in FIG. 13 may be swapped with each other, or the positions of the artificial muscles 2f and 2h may be swapped with each other. Specifically, the actuator 1B suffices if the artificial muscles 2e and 2f are antagonistically arranged with the displaceable portion 25b interposed therebetween and the artificial muscles 2g and 2h are antagonistically arranged with the displaceable portion 25b interposed therebetween.

In this embodiment, for example, the tube 10A of the artificial muscle 2e is right-hand coiled, each groove of the artificial muscle 2e extends left-hand helically, the tube 10B of the artificial muscle 2f is right-hand coiled, and each groove of the artificial muscle 2f extends right-hand helically. However, the tube 10B of the artificial muscle 2f may be left-hand coiled and each groove of the artificial muscle 2f may extend left-hand helically. In the case where the tube 10A of the artificial muscle 2e is left-hand coiled and each groove of the artificial muscle 2e extends right-hand helically, the tube 10B of the artificial muscle 2f may be left-hand coiled and each groove of the artificial muscle 2f may extend left-hand helically or, the tube 10B of the artificial muscle 2f may be right-hand coiled and each groove of the artificial muscle 2f may extend right-handed helically.

In this embodiment, for example, both artificial muscles 2g and 2h have a homochiral structure. However, both artificial muscles 2g and 2h may have a heterochiral structure.

In this embodiment, for example, all the artificial muscles 2e to 2h are made of the same material and have the same size. However, this is not the only possible structure. The pair of the artificial muscles 2e and 2f may be made of a material different from the material of the pair of the artificial muscles 2g and 2h or may have a size different from that of the pair of the artificial muscles 2g and 2h.

In this embodiment, for example, the winding wire 5c is wound around the outer periphery of the disk 6c. Alternatively, the winding wire 5c may be directly attached to the outer edge of the disk 6c.

Third Embodiment

Figure 14:
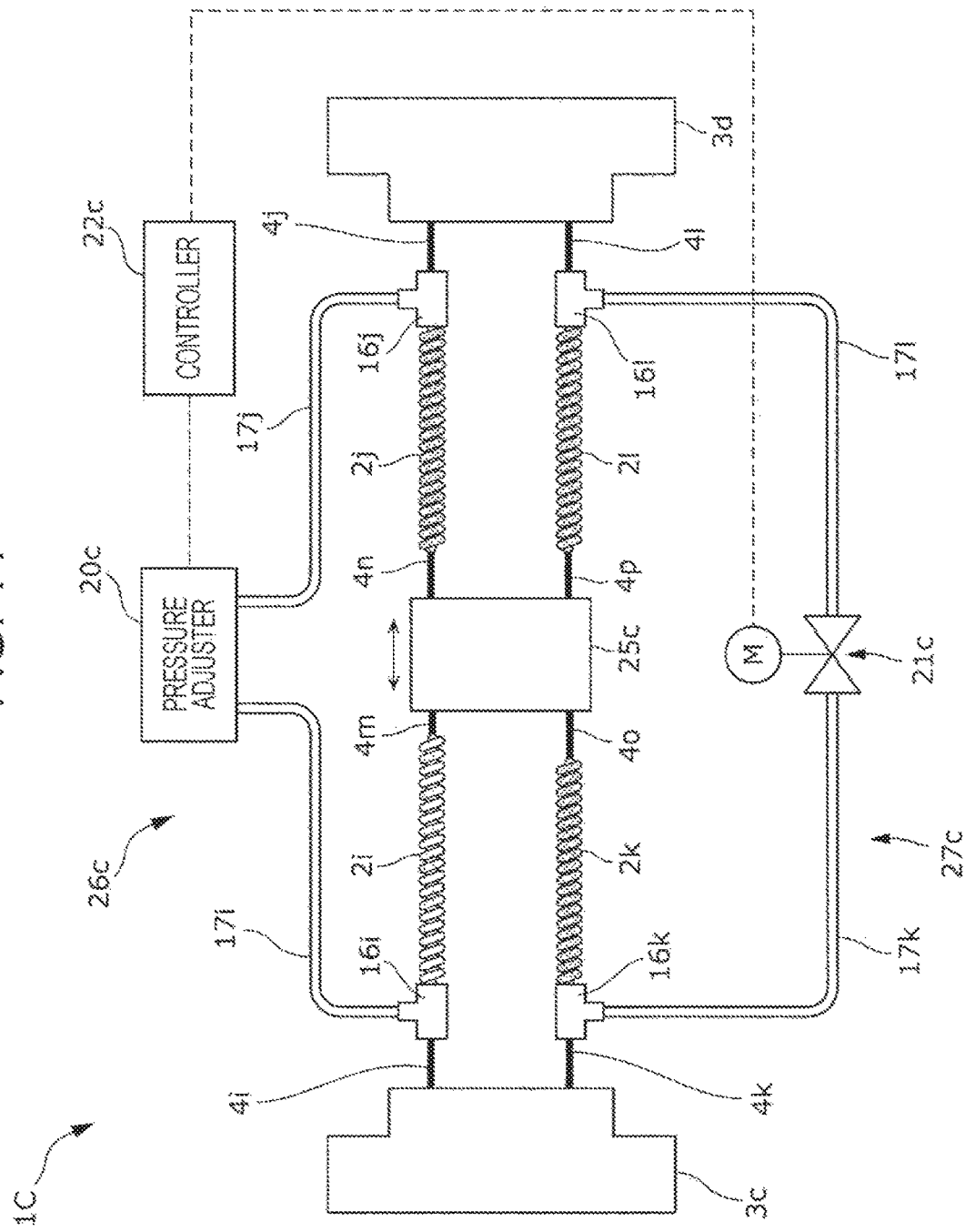
FIG. 14 is a schematic plan view of an actuator according to a third embodiment.

FIG. 14 is a schematic plan view of an actuator 1C according to a third embodiment.

First, the schematic structure of the actuator 1C is described.

The actuator 1C includes a first artificial muscle 2i and a second artificial muscle 2j, which are arranged in a line, and a third artificial muscle 2k and a fourth artificial muscle 2l, which are arranged in a line. Hereinbelow, the first artificial muscle 2i, the second artificial muscle 2j, the third artificial muscle 2k, and the fourth artificial muscle 2l are also referred to as the artificial muscles 2i, 2j, 2k, and 2l. The artificial muscles 2i to 2l are tubular and filled with the fluid 15. The artificial muscles 2i to 2l contract or expand in accordance with a change in pressure of the fluid 15 inside themselves. The artificial muscle 2i has a heterochiral structure, as in the case of the above artificial muscle 2a, and the artificial muscles 2j, 2k, and 2l have a homochiral structure, as in the case of the above artificial muscles 2b, 2c, and 2d.

The actuator 1C includes a position changer 26c, which changes the position of a displaceable portion 25c, and a stiffness changer 27c, which changes the stiffness of the displaceable portion 25c in a movement direction.

The displaceable portion 25c is disposed between base plates 3c and 3d and rendered laterally slidable by a translation bearing (not illustrated). The displaceable portion 25c is disposed on a path connecting the artificial muscles 2i and 2j to each other and on a path connecting the artificial muscles 2k and 2l to each other. The displaceable portion 25c is rendered displaceable in a predetermined direction (translation direction) when the artificial muscles 2i and 2j exert a force in a direction of contraction and expansion of the artificial muscles 2i and 2j. The position changer 26c includes the artificial muscles 2i and 2j, coupling wires 4i, 4j, 4m, and 4n, joints 16i and 16j, pipes 17i and 17j, and a pressure adjuster 20c. The stiffness changer 27c includes the artificial muscles 2k and 2l, coupling wires 4k, 4l, 4o, and 4p, joints 16k and 16l, pipes 17k and 17l, and an open-close valve 21c.

The actuator 1C also includes a controller 22c that drives the pressure adjuster 20c and that controls opening and closing of the open-close valve 21c.

Now, components of the actuator 1C are described.

A first end of the artificial muscle 2i is connected to the base plate 3c with the joint 16i and the coupling wire 4i interposed therebetween. A first end of the artificial muscle 2j is connected to the base plate 3d with the joint 16j and the coupling wire 4j interposed therebetween. Second ends of the artificial muscles 2i and 2j are connected to the displaceable portion 25c with the coupling wires 4m and 4n interposed therebetween. The artificial muscles 2i and 2j are arranged between the displaceable portion 25c and the base plates 3c and 3d while being pulled to cause an initial tension.

A first end of the artificial muscle 2k is connected to the base plate 3c with the joint 16k and the coupling wire 4k interposed therebetween. A first end of the artificial muscle 2l is connected to the base plate 3d with the joint 16l and the coupling wire 4l interposed therebetween. Second ends of the artificial muscles 2k and 2l are connected to the displaceable portion 25c with the coupling wires 4o and 4p interposed therebetween. The artificial muscles 2k and 2l are arranged between the displaceable portion 25c and the base plates 3c and 3d while being pulled to cause an initial tension.

The actuator 1C is formed so as to be capable of exerting, to the outside using the displaceable portion 25c, a force generated by the artificial muscles 2i and 2j.

The pressure adjuster 20c, which changes the pressure of the fluid 15 filled in the artificial muscles 2i and 2j, is connected to the artificial muscles 2i and 2j, constituting the position changer 26c. Specifically, the artificial muscle 2i is connected to the pressure adjuster 20c with the joint 16i and the pipe 17i interposed therebetween and the artificial muscle 2j is connected to the pressure adjuster 20c with the joint 16j and the pipe 17j interposed therebetween.

The controller 22c expands the artificial muscle 2i and contracts the artificial muscle 2j by increasing the pressure of the fluid 15 using the pressure adjuster 20c so as to displace the displaceable portion 25c in a predetermined direction. Conversely, the controller 22c contracts the artificial muscle 2i and expands the artificial muscle 2j by decreasing the pressure of the fluid 15 using the pressure adjuster 20c so as to displace the displaceable portion 25c in the direction opposite to the predetermined direction. Thus, the controller 22c controls the position of the displaceable portion 25c.

Examples used as the pressure adjuster 20c include a syringe pump (reciprocating pump). A syringe pump is a pump including a cylindrical syringe and a movable pusher, as in the case of an injector, and a controller that controls the position of the pusher. The syringe pump pressurizes the inside of the syringe using the pusher to discharge the fluid or reduces the pressure in the syringe using the pusher to recover the fluid. Operating the syringe pump enables an adjustment of the amount and/or the pressure of the fluid filled in the artificial muscles 2i and 2j. Examples of the fluid 15 used in this embodiment include a liquid such as water.

Here, a single syringe pump is used to cause the fluid 15 of the same pressure or the same amount of the fluid 15 to concurrently flow into or out of the artificial muscles 2i and 2j. Alternatively, multiple syringe pumps may be used to cause the fluid 15 of the same pressure or the same amount of the fluid 15 to concurrently flow into or out of the artificial muscles 2i and 2j.

On the other hand, the open-close valve 21c, which adjusts opening or closing of the path allowing communication between the portions of the fluid filled in the artificial muscles 2k and 2l, is connected to the artificial muscles 2k and 2l, constituting the stiffness changer 27c. Specifically, the artificial muscle 2k is connected to the open-close valve 21c with the joint 16k and the pipe 17k interposed therebetween. The artificial muscle 2l is connected to the open-close valve 21c with the joint 16l and the pipe 17l interposed therebetween. Specifically, the open-close valve 21c is disposed on the path of the pipe that connects the artificial muscles 2k and 2l to each other and that allows the fluid 15 filled in the artificial muscles 2k and 2l to flow therethrough. The open-close valve 21c adjusts opening and closing of the path.

The controller 22c controls opening or closing of the open-close valve 21c to control the amount of the fluid 15 flowing into or out of the artificial muscles 2k and 2l. Thus, the controller 22c controls the stiffness of the artificial muscles 2k and 2l, that is, the stiffness of the displaceable portion 25c in the movement direction.

The actuator 1C according to this embodiment is thus also capable of independently adjusting the position of the displaceable portion 25c using the pressure adjuster 20c and the stiffness of the displaceable portion 25c in the movement direction using the open-close valve 21c.

Fourth Embodiment

Figure 15:
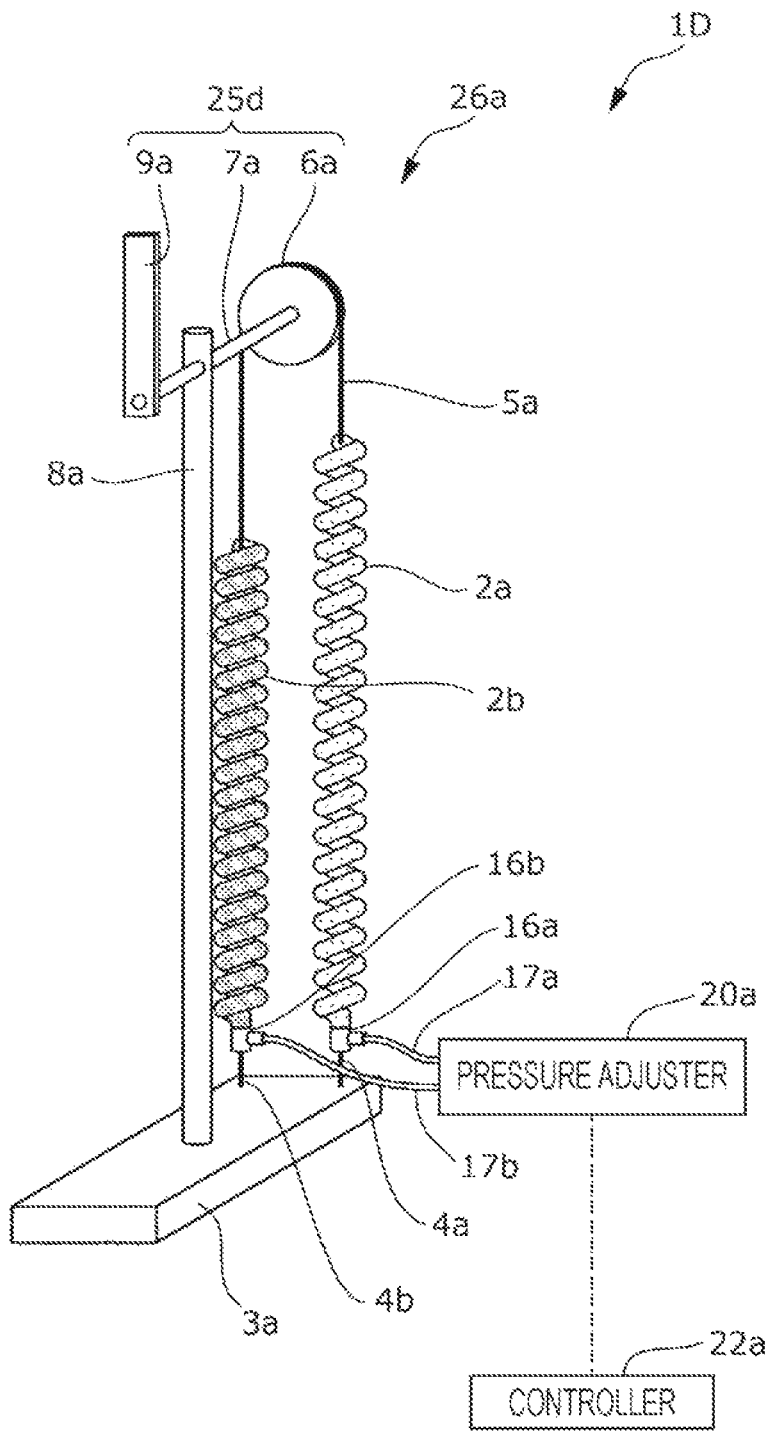
FIG. 15 is a schematic diagram of an actuator according to a fourth embodiment.

FIG. 15 is a schematic diagram of an actuator 1D according to a fourth embodiment.

First, the schematic structure of the actuator 1D is described.

The actuator 1D includes a first artificial muscle 2a and a second artificial muscle 2b, which extend parallel to each other and are arranged side by side.

The actuator 1D includes a position changer 26a, which changes the position of a displaceable portion 25d.

The displaceable portion 25d includes a disks 6a, a shaft 7a, and an arm 9a, which rotate integrally. The displaceable portion 25d is disposed on a path connecting the artificial muscles 2a and 2b to each other. The displaceable portion 25d is rendered displaceable in a predetermined direction (rotation direction) when the artificial muscles 2a and 2b exert a force in a tangential direction of the disk 6a. The position changer 26a includes the artificial muscles 2a and 2b, coupling wires 4a and 4b, a winding wire 5a, joints 16a and 16b, pipes 17a and 17b, and a pressure adjuster 20a. The actuator 1D also includes a controller 22a, which controls driving of the pressure adjuster 20a.

The controller 22a expands the artificial muscle 2a and contracts the artificial muscle 2b by increasing the pressure of the fluid 15 using the pressure adjuster 20a so as to displace the displaceable portion 25d in a predetermined direction. Conversely, the controller 22a contracts the artificial muscle 2a and expands the artificial muscle 2b by decreasing the pressure of the fluid 15 using the pressure adjuster 20a so as to displace the displaceable portion 25d in the direction opposite to the predetermined direction. Thus, the controller 22a controls the rotation position of the displaceable portion 25d.

The actuator 1D according to this embodiment is capable of changing the position of the displaceable portion 25d with a predetermined pressure while the displaceable portion 25d keeps an antagonistic state. At this time, the sum of the tension of the artificial muscle 2a and the tension of the artificial muscle 2b remains unchanged, so that the position of the displaceable portion 25d is adjustable without changing the stiffness of the displaceable portion 25d in the movement direction.

Thus far, actuator structures according to one or more aspects have been described on the basis of some embodiments. The present disclosure, however, is not limited to these embodiments. Without departing from the gist of the present disclosure, various modifications of the embodiments conceivable by persons skilled in the art or other aspects formed by combining components from different embodiments may be included in the one or more aspects.

An actuator disclosed herein is usable as an artificial muscle actuator that drives a machine operating in the household environment, and applicable to the field of wearable assist devices such as clothing. An actuator disclosed herein is usable as an actuator flexible toward an external force.

What is claimed is:

1. An actuator comprising:
   a displaceable portion including a first member and a second member;
   a first artificial muscle; and
   a second artificial muscle,
   wherein a force generated by the first artificial muscle and the second artificial muscle is transmitted to the second member using the first member and the transmitted force displaces the second member in a first direction or a second direction opposite to the first direction,
   wherein the first artificial muscle includes a coiled elastic first tube,
   wherein the first tube has either one or both of a helical first groove in an outer circumferential surface of the first tube and a helical second groove in an inner circumferential surface of the first tube,
   wherein a center axis of a helix of the first groove and a center axis of a helix of the second groove serve as an axis of the first tube,
   wherein the first tube is filled with a first fluid,
   wherein the second artificial muscle includes a coiled elastic second tube,
   wherein the second tube has either one or both of a helical third groove in an outer circumferential surface of the second tube and a helical fourth groove in an inner circumferential surface of the second tube,
   wherein a center axis of a helix of the third groove and a center axis of a helix of the fourth groove serve as an axis of the second tube,
   wherein the second tube is filled with a second fluid,
   wherein a direction in which the first tube is coiled is opposite to a direction in which the first groove extends helically and a direction in which the second groove extends helically, and
   wherein a direction in which the second tube is coiled is the same as a direction in which the third groove extends helically and a direction in which the fourth groove extends helically.

2. The actuator according to claim 1,
   wherein the first artificial muscle is formed from the same material as the second artificial muscle and has the same coil diameter and the same coil pitch in relaxed length as the second artificial muscle, and
   wherein, when the first tube and the second tube are uncoiled, the first tube has the same shape as the second tube or has a shape of a plane symmetric reflection of a shape of the second tube.

3. The actuator according to claim 1, further comprising:
   a pressure adjuster that changes a pressure of the first fluid and a pressure of the second fluid; and
   a controller,
   wherein, to displace the second member in the first direction, the controller instructs the pressure adjuster to increase the pressure of the first fluid and the pressure of the second fluid and thus expands the first artificial muscle and contracts the second artificial muscle, and wherein, to displace the second member in the second direction, the controller instructs the pressure adjuster to reduce the pressure of the first fluid and the pressure of the second fluid and thus contracts the first artificial muscle and expands the second artificial muscle.

4. The actuator according to claim 3, further comprising:
a third artificial muscle and a fourth artificial muscle, on which a force is exerted from the first artificial muscle and the second artificial muscle with the first member interposed therebetween; and
an open-close valve disposed in a pipe connecting the third artificial muscle and the fourth artificial muscle to each other,
wherein the third artificial muscle includes a coiled elastic third tube,
wherein the third tube has either one or both of a helical fifth groove in an outer circumferential surface of the third tube and a helical sixth groove in an inner circumferential surface of the third tube,
wherein a center axis of a helix of the fifth groove and a center axis of a helix of the sixth groove serve as an axis of the third tube,
wherein the fourth artificial muscle includes a coiled elastic fourth tube,
wherein the fourth tube has either one or both of a helical seventh groove in an outer circumferential surface of the fourth tube and a helical eighth groove in an inner circumferential surface of the fourth tube,
wherein a center axis of a helix of the seventh groove and a center axis of a helix of the eighth groove serve as an axis of the fourth tube,
wherein a direction in which the third tube is coiled is the same as or opposite to a direction in which the fifth groove extends helically and a direction in which the sixth groove extends helically,
wherein a direction in which the fourth tube is coiled is the same as the direction in which the third tube is coiled and a direction in which the seventh groove extends helically and a direction in which the eighth groove extends helically are the same as the direction in which the fifth groove extends helically, or, the direction in which the fourth tube is coiled is opposite to the direction in which the third tube is coiled and the direction in which the seventh groove extends helically and the direction in which the eighth groove extends helically are opposite to the direction in which the fifth groove extends helically,
wherein the third tube is filled with a third fluid and the fourth tube is filled with a fourth fluid,
wherein the pipe serves as a flow path for the third fluid to flow to the fourth tube and a flow path for the fourth fluid to flow to the third tube, and
wherein the controller causes the open-close valve to control opening and closing of the open-close valve so as to control an amount of the third fluid that moves from the third artificial muscle to the fourth artificial muscle and an amount of the fourth fluid that moves from the fourth artificial muscle to the third artificial muscle.

5. The actuator according to claim 4, wherein the third artificial muscle and the fourth artificial muscle are formed from the same material and have the same shape.

6. The actuator according to claim 4, wherein the direction in which the third tube is coiled is the same as the direction in which the third groove extends helically.

7. The actuator according to claim 4,
wherein the displaceable portion has a rotation axis about which the first member and the second member are rotatable,
wherein a displacement in the first direction is a rotation in the first direction about the rotation axis,
wherein a displacement in the second direction is a rotation in a direction opposite to the first direction about the rotation axis, and
wherein the open-close valve controls resistance to a rotation operation of the displaceable portion.

8. The actuator according to claim 4, wherein the first artificial muscle and the third artificial muscle are arranged side by side so as to extend parallel to each other and the second artificial muscle and the fourth artificial muscle are arranged side by side so as to extend parallel to each other.

9. The actuator according to claim 4, wherein the first artificial muscle and the third artificial muscle are arranged in a line and the second artificial muscle and the fourth artificial muscle are arranged in a line.

10. The actuator according to claim 4, wherein a minimum length of the first artificial muscle within a movable range of the displaceable portion is a relaxed length of the first artificial muscle.

11. The actuator according to claim 4, further comprising:
a first pressure-measuring portion that measures a first pressure of the third fluid; and
a second pressure-measuring portion that measures a second pressure of the fourth fluid,
wherein the controller opens the open-close valve when the first pressure or the second pressure deviates from a predetermined pressure range.

12. A method for driving an actuator,
the actuator including
a displaceable portion including a first member, a second member, and a third member,
a first artificial muscle,
a second artificial muscle, and
a third artificial muscle and a fourth artificial muscle, on which a force of the first artificial muscle and the second artificial muscle is exerted using the first member and the third member,
wherein the first member is disposed on a path connecting the first artificial muscle and the second artificial muscle to each other and the third member is disposed on a path connecting the third artificial muscle and the fourth artificial muscle to each other,
wherein the first artificial muscle includes a coiled elastic first tube,
wherein the first tube has either one or both of a helical first groove in an outer circumferential surface of the first tube and a helical second groove in an inner circumferential surface of the first tube,
wherein a center axis of a helix of the first groove and a center axis of a helix of the second groove serve as an axis of the first tube,
wherein the first tube is filled with a first fluid,
wherein the second artificial muscle includes a coiled elastic second tube,
wherein the second tube has either one or both of a helical third groove in an outer circumferential surface of the second tube and a helical fourth groove in an inner circumferential surface of the second tube, wherein a center axis of a helix of the third groove and a center axis of a helix of the fourth groove serve as an axis of the second tube,
wherein the second tube is filled with a second fluid,
wherein the third artificial muscle includes a coiled elastic third tube,
wherein the third tube has either one or both of a helical fifth groove in an outer circumferential surface of the third tube and a helical sixth groove in an inner circumferential surface of the third tube,
wherein a center axis of a helix of the fifth groove and a center axis of a helix of the sixth groove serve as an axis of the third tube,
wherein the third tube is filled with a third fluid,
wherein the fourth artificial muscle includes a coiled elastic fourth tube,
wherein the fourth tube has either one or both of a helical seventh groove in an outer circumferential surface of the fourth tube and a helical eighth groove in an inner circumferential surface of the fourth tube,
wherein a center axis of a helix of the seventh groove and a center axis of a helix of the eighth groove serve as an axis of the fourth tube,
wherein the fourth tube is filled with a fourth fluid,
wherein a direction in which the first tube is coiled is opposite to a direction in which the first groove extends helically and a direction in which the second groove extends helically,
wherein a direction in which the second tube is coiled is the same as a direction in which the third groove extends helically and a direction in which the fourth groove extends helically,
wherein a direction in which the third tube is coiled is the same as or opposite to a direction in which the fifth groove extends helically and a direction in which the sixth groove extends helically,
wherein a direction in which the fourth tube is coiled is the same as the direction in which the third tube is coiled and a direction in which the seventh groove extends helically and a direction in which the eighth groove extends helically are the same as the direction in which the fifth groove extends helically, or, the direction in which the fourth tube is coiled is opposite to the direction in which the third tube is coiled and the direction in which the seventh groove extends helically and the direction in which the eighth groove extends helically are opposite to the direction in which the fifth groove extends helically, and
wherein the actuator further includes
a pressure adjuster that changes a pressure of the first fluid and a pressure of the second fluid,
an open-close valve disposed in a pipe connecting the third artificial muscle and the fourth artificial muscle to each other, the pipe serving as a flow path for the third fluid to flow to the fourth tube and a flow path for the fourth fluid to flow to the third tube, and
a controller that drives the pressure adjuster and controls opening and closing of the open-close valve,
the method comprising:
changing the pressure of the first fluid and the pressure of the second fluid using the pressure adjuster in response to a position command issued to change a position of the second member to a target position;
calculating a target pressure difference between the third fluid and the fourth fluid on the basis of the position command and a stiffness command issued to change a stiffness of the displaceable portion to a target stiffness; and
comparing an actual pressure difference between the third fluid and the fourth fluid with the target pressure difference and approximating the actual pressure difference to the target pressure difference by controlling opening and closing of the open-close valve.

* * * * *